(12) United States Patent
Kelly

(10) Patent No.: US 11,044,846 B2
(45) Date of Patent: Jun. 29, 2021

(54) CUTTER HOUSING ASSEMBLY FOR A LAWNMOWER, LAWNMOWER HAVING SAME, AND CONVERTIBLE LAWNMOWER

(71) Applicant: Honda Motor Co., Ltd., Tokyo (JP)

(72) Inventor: Teegan L. Kelly, Burlington, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 16/371,822

(22) Filed: Apr. 1, 2019

(65) Prior Publication Data
US 2020/0305345 A1   Oct. 1, 2020

(51) Int. Cl.
*A01D 34/00* (2006.01)
*A01D 34/71* (2006.01)
*A01D 34/81* (2006.01)
*A01D 34/73* (2006.01)
*A01D 101/00* (2006.01)

(52) U.S. Cl.
CPC ......... *A01D 34/733* (2013.01); *A01D 34/005* (2013.01); *A01D 34/71* (2013.01); *A01D 34/81* (2013.01); *A01D 2101/00* (2013.01)

(58) Field of Classification Search
CPC .... A01D 42/005; A01D 34/81; A01D 34/733; A01D 34/71; A01D 34/667; A01D 34/668; A01D 34/005; A01D 2101/00
See application file for complete search history.

(56) References Cited

U.S. PATENT DOCUMENTS

| | | | | |
|---|---|---|---|---|
| 3,423,918 A | * | 1/1969 | Siwek | A01D 34/71 56/202 |
| 4,890,446 A | * | 1/1990 | Israel | A01D 42/005 56/17.5 |
| 5,826,416 A | * | 10/1998 | Sugden | A01D 34/71 56/320.2 |
| 5,845,475 A | * | 12/1998 | Busboom | A01D 34/005 56/320.1 |
| 6,609,358 B1 | | 8/2003 | Schmidt et al. | |
| 6,694,716 B1 | * | 2/2004 | Osborne | A01D 43/063 56/202 |
| 6,843,048 B2 | | 1/2005 | Osborne | |

(Continued)

FOREIGN PATENT DOCUMENTS

JP     2014100126 A     6/2014

*Primary Examiner* — Thomas B Will
*Assistant Examiner* — Madeline Ivy Runco
(74) *Attorney, Agent, or Firm* — Kenealy Vaidya LLP

(57) ABSTRACT

A lawn mower and a cutter housing assembly can include a cutter housing, a first and second rotation arms, and first and second plates pivotably attached to the cutter housing. The first plate and second plate can be selectively rotatable between: (a) a discharge mode in which the plates are positioned a first distance from the front wall of the cutter housing to provide a first gap, and (b) a mulch mode in which the plates are positioned a second distance greater than the first distance from the front wall to provide a decreased gap. A first actuator and second actuator can be connected to the first and second rotation arms to cause rotation of the first and second rotation arms when actuated. Actuation of the first actuator and second actuator can cause the first plate and second plate to move between the discharge mode and the mulch mode.

18 Claims, 9 Drawing Sheets

(56) References Cited

U.S. PATENT DOCUMENTS

| | | | |
|---|---|---|---|
| 6,910,324 B2* | 6/2005 | Kakuk | A01D 34/71 |
| | | | 56/255 |
| 7,051,504 B2* | 5/2006 | Osborne | A01D 43/0631 |
| | | | 56/320.2 |
| 7,093,415 B2 | 8/2006 | Kallevig et al. | |
| 7,174,700 B2 | 2/2007 | Chenevert et al. | |
| 7,204,073 B1 | 4/2007 | Chenevert | |
| 7,360,352 B2 | 4/2008 | Samejima et al. | |
| 7,574,852 B1* | 8/2009 | Loxterkamp | A01D 34/667 |
| | | | 56/320.2 |
| 7,677,022 B2 | 3/2010 | Chenevert et al. | |
| 8,156,722 B2* | 4/2012 | Sugio | A01D 34/81 |
| | | | 56/320.1 |
| 8,950,167 B2 | 2/2015 | Moroi et al. | |
| 9,066,469 B2 | 6/2015 | Kimura et al. | |
| 9,485,911 B2 | 11/2016 | Thorman et al. | |
| 9,699,963 B2 | 7/2017 | Ressler et al. | |
| 9,750,179 B2 | 9/2017 | Korthals et al. | |
| 9,756,782 B2* | 9/2017 | Andre | A01D 34/69 |
| 2009/0301050 A1 | 12/2009 | Kohler | |
| 2018/0325024 A1* | 11/2018 | Rotole | A01D 57/24 |

* cited by examiner

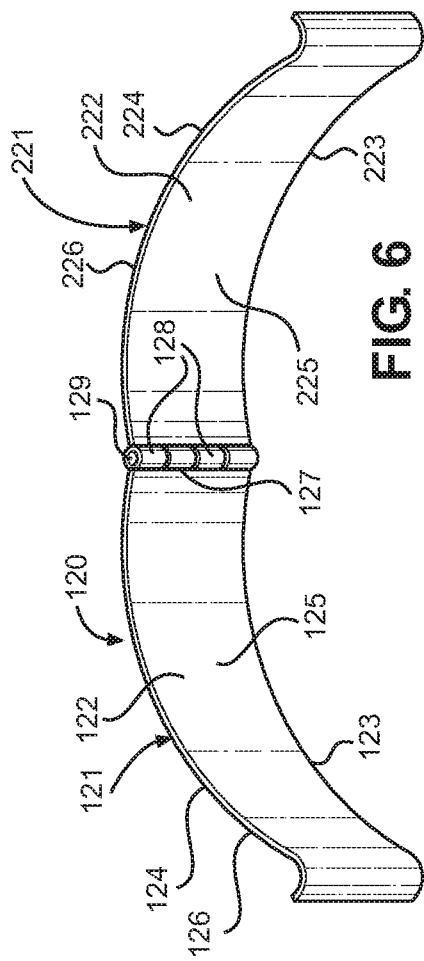
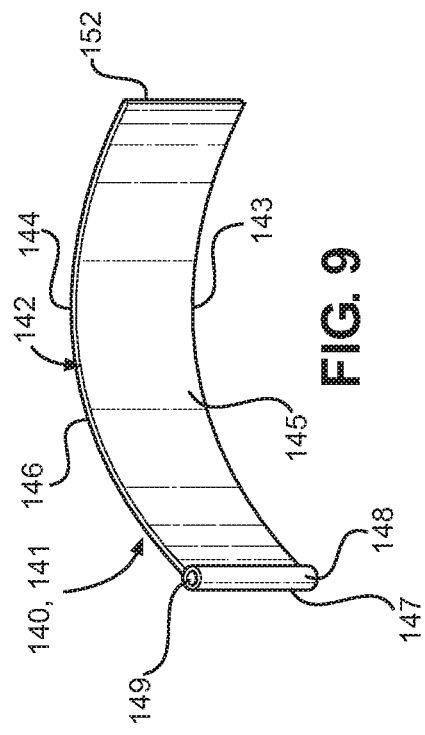
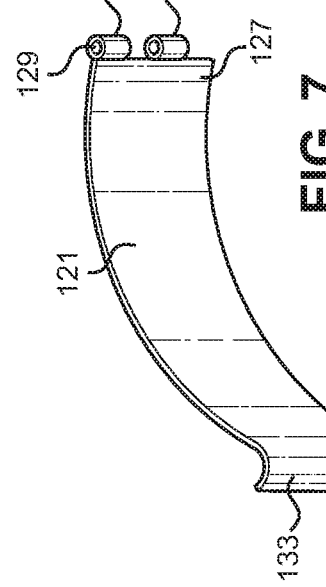
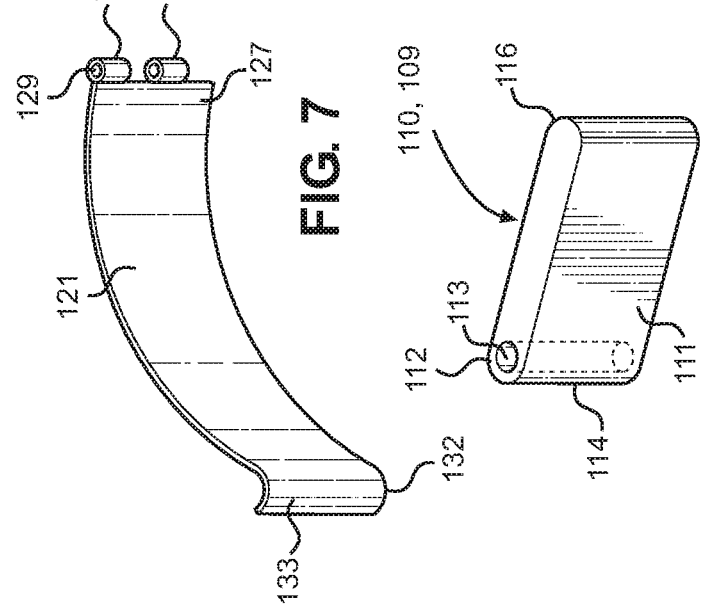

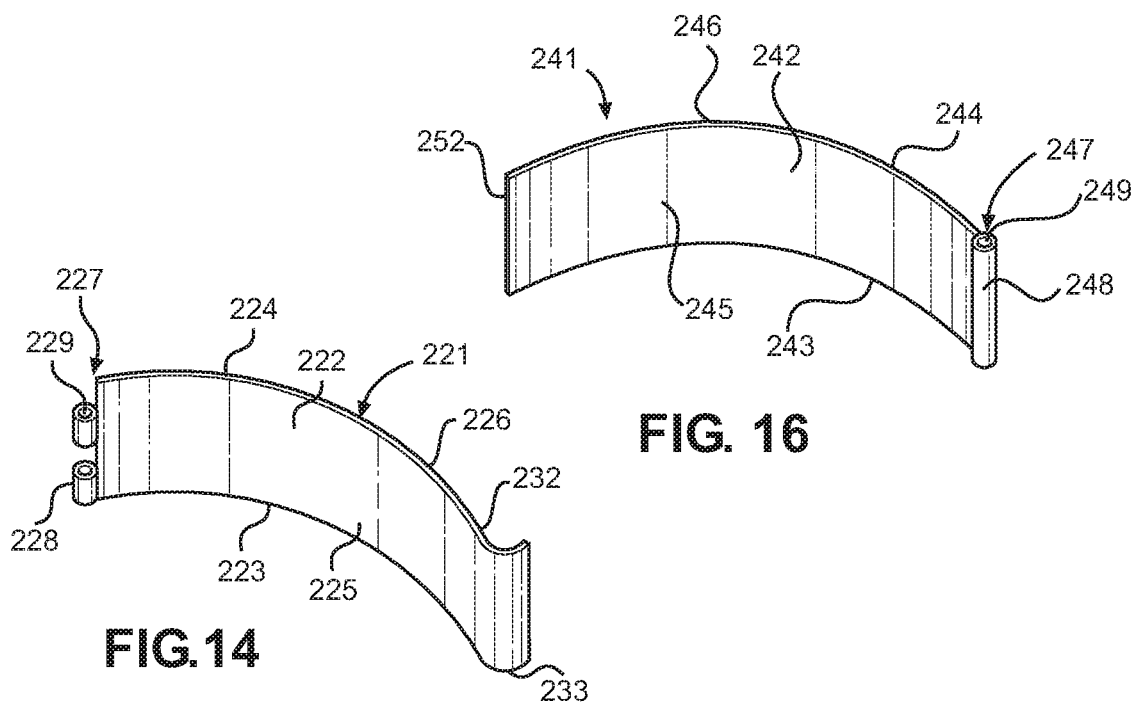
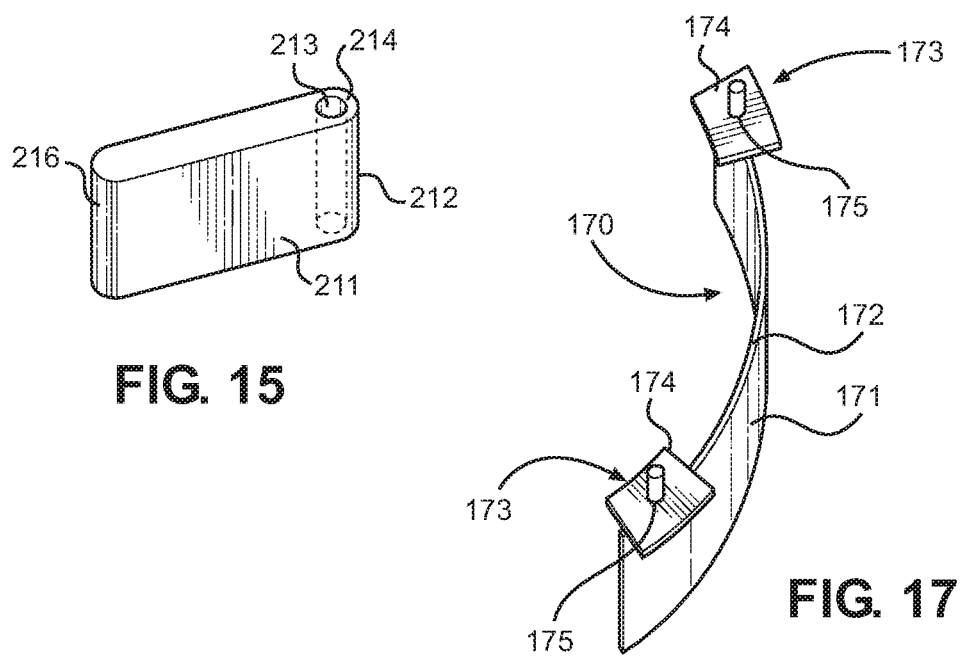

CUTTER HOUSING ASSEMBLY FOR A LAWNMOWER, LAWNMOWER HAVING SAME, AND CONVERTIBLE LAWNMOWER

BACKGROUND

Lawnmowers can be configured as garden tractors, riding mowers, commercial walk-behind mowers and residential walk-behind mowers. Walk-behind mowers can include a prime mover mounted to the deck of the lawnmower. Mower decks associated with garden tractors, riding mowers and commercial walk-behind mowers can be movably or removably attached to the frame of these self-propelled machines. More than one blade can be mounted in the cutting chamber of the deck for any of these embodiments of a lawnmower.

Lawnmowers can be configured to either mulch clippings, which are generated as mowing is performed, or to discharge the clippings through a discharge chute or a discharge opening. Mulching mowers cut the clippings into fine particles and blow the clippings back into the lawn. Discharge mowers can either discharge the clippings directly onto the lawn surface or into a bag that is attached to the lawnmower. The clippings can then be disposed of elsewhere. Some lawnmowers can be converted between mulching lawnmowers and discharge lawnmowers by inserting or removing a conversion assembly mounted within the cutter housing and/or the discharge chute such that the operator of the lawnmower removes or installs the conversion assembly in order to place the lawnmower in the discharge mode and the mulching mode, respectively. Instead of a removable conversion assembly, some lawnmowers have a movable mulching assembly that remains mounted within the cutter housing and/or the discharge chute and is movable by the operator of the lawnmower between a mulching position and a discharging position within the cutter housing. Some mulching systems are variable mulching system in which one or more movable components can be moved into any one of a plurality of positions between the mulching position and the discharging position such that some of the clippings are mulched and some of the clippings are discharged, via the discharge chute, into a collection bag or onto the ground.

SUMMARY

According to an aspect of the disclosed subject matter, a lawn mower and a cutter housing assembly can include a cutter housing that has a front wall and a first cutting chamber with a first discharge opening. A first rotation arm and second rotation arm can be pivotably attached to the cutter housing. A first plate and second plate can be pivotably attached to the cutter housing. The first plate and second plate can be selectively rotatable between: (a) a discharge mode in which the first plate and second plate are positioned a first distance from the front wall of the cutter housing to provide a first gap, and (b) a mulch mode in which the first plate and second plate are positioned a second distance greater than the first distance from the front wall of the cutter housing to provide a decreased gap, relative to the first gap. A first actuator can be connected to the first rotation arm to cause rotation of the first rotation arm when actuated. A second actuator can be connected to the second rotation arm to cause rotation of the second rotation arm when actuated. Actuation of the first actuator and second actuator can cause the first plate and second plate to move between the discharge mode and the mulch mode.

According to another aspect of the disclosed subject matter, a cutter housing assembly for a lawnmower can include a cutter housing that includes a first cutting chamber with a first discharge opening, and a further cutting chamber with a further discharge opening. A primary plate can be movably attached to the cutter housing and selectively movable between: (a) a discharge mode in which the primary plate is in a first position to provide a first gap associated with the first discharge opening, and (b) a mulch mode in which the primary plate is in a second position spaced from the first position to provide a decreased gap, relative to the first gap, associated with the first discharge opening. A secondary plate can be movably attached to the cutter housing and selectively movable between: (a) a discharge mode in which the secondary plate is in an initial position, and (b) a mulch mode in which the secondary plate is in a final position different from the initial position. A first actuator can be controllable by a user and connected to the primary plate such that a user can cause the primary plate to move from the discharge mode first position to the mulch mode second position.

According to yet another aspect of the disclosed subject matter, a lawnmower can include a cutter housing that includes a first cutting chamber with a first blade rotatable about a first blade axis, the first cutting chamber including a first discharge opening, and a second cutting chamber with a second blade rotatable about a second blade axis, the second cutting chamber including a second discharge opening leading to the first cutting chamber. A first curved plate can be pivotably attached to the cutter housing such that the first curved plate is rotatable towards and away from at least one of the first blade axis and second blade axis. A second curved plate can be pivotably attached to the cutter housing such that the second curved plate is rotatable towards and away from at least one of the first blade axis and second blade axis. The first plate and second plate can be selectively rotatable between: (a) a discharge mode in which the first plate and second plate are positioned a first distance from at least one of the first blade axis and second blade axis, and (b) a mulch mode in which the first plate and second plate are positioned a second distance less than the first distance from the at least one of the first blade axis and second blade axis. A first actuator can be connected to at least one of the first curved plate and second curved plate to cause rotation of at least one of the first curved plate and second curved plate when actuated.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 6 is a perspective bottom view of a primary plate assembly of the cutter housing assembly of FIG. 5.

FIG. 7 is a perspective bottom view of a first primary plate of FIG. 6.

FIG. 8 is a perspective bottom view of a rotation arm of the cutter housing assembly of FIG. 5.

FIG. 9 is a perspective bottom view of a first secondary plate of the cutter housing assembly of FIG. 5.

FIG. 14 is a perspective bottom view of a second primary plate of the primary plate assembly of FIG. 6.

FIG. 15 is a perspective bottom view of a second rotation arm of the cutter housing assembly of FIG. 5.

FIG. 16 is a perspective bottom view of a second secondary plate of the cutter housing assembly of FIG. 5.

FIG. 17 is a schematic perspective top view of an exterior plate assembly of the cutter housing assembly of FIG. 5.

DETAILED DESCRIPTION OF EXEMPLARY EMBODIMENTS

Figure 1:
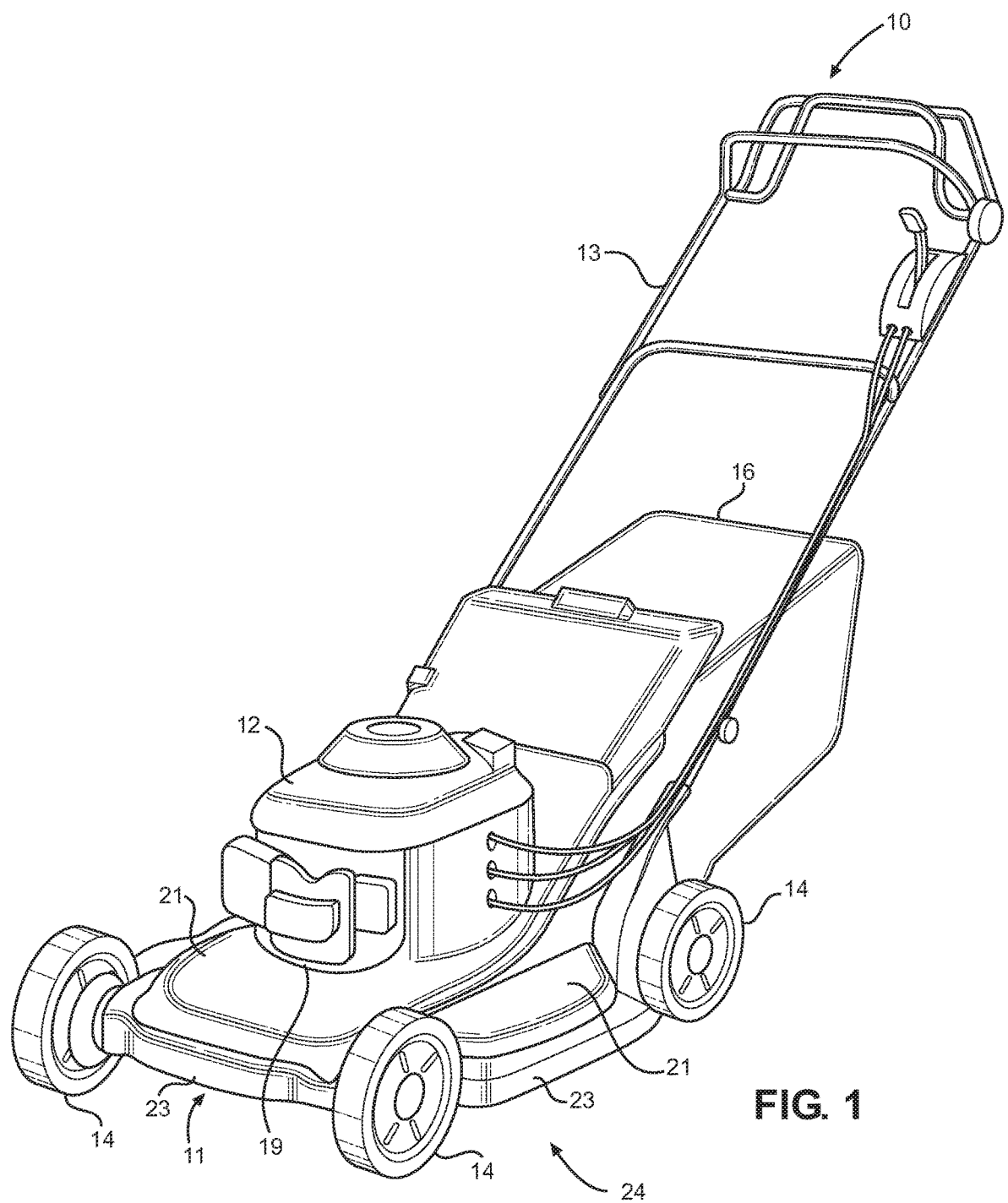
FIG. 1 is a perspective view of a lawnmower made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Mulching assemblies for lawnmowers are known that convert a lawnmower between a discharge mode and a mulch mode. In the mulch mode, the mower cuts vegetation (e.g., grass) and distributes the cut vegetation back to the ground to work as a fertilizer. The discharge mode typically allows the cut vegetation to be stored in a bag or other container connected to the lawnmower's cutter housing for disposal. The discharge opening can be located either on the side of the cutter housing or through a back opening in the cutter housing. Some mulching assemblies are permanently mounted in the cutter housing of the lawnmower, and often include many components including different mulch baffles, mulch doors, levers, and rotating gears that allow conversion from a full mulching mode to a discharge mode. These many components can result in a labor-intensive assembly for manufacturing and operation. Thus, the manufacturing and operational cost can increase as compared to a lawnmower that includes a removable conversion assembly. With removable mulch assemblies, the user or operator may need to manually attach baffles or other structure in order to mulch. However, this can be hard work, time-consuming, inconvenient, and costly due to replacement cost and wear and tear from removing and replacing. Thus, there is a need for a mulching assembly that can reduce manufacturing and operational costs, and lessen or avoid inconvenience perceived by the operator when converting the lawnmower between the discharge mode and the mulching mode.

The present disclosure provides a variable mulch system for a single or multi bladed lawnmower deck or cutter housing. In one disclosed arrangement, rotation arms can push plates out away from a front wall of the mower deck or housing so as to switch from full side discharge to full mulch. The plates can create a front baffle in the deck or cutter housing. At various positions in movement of the arms and plates, more or less of a gap between the cutting chambers can be created so as to selectively allow or disallow grass clippings to pass between and/or through the cutting chambers. The more of a gap, the more a discharge. The less of a gap, the more mulching takes place. Arms and plates can be suspended from a top of the cutter housing and ride or be guided by channels or slots in the top of the cutter deck. The arms and plates can retract back into place and/or otherwise be biased to a certain position, disposition, or arrangement by using springs, biasing elements and/or gears or other known movement control devices when changing from full mulch to full side discharge or interim positions there between. For example, the plates and arms can be rotated by a push/pull cable system, a crank and gear system, an electronically powered gear system, or other.

Figure 2:
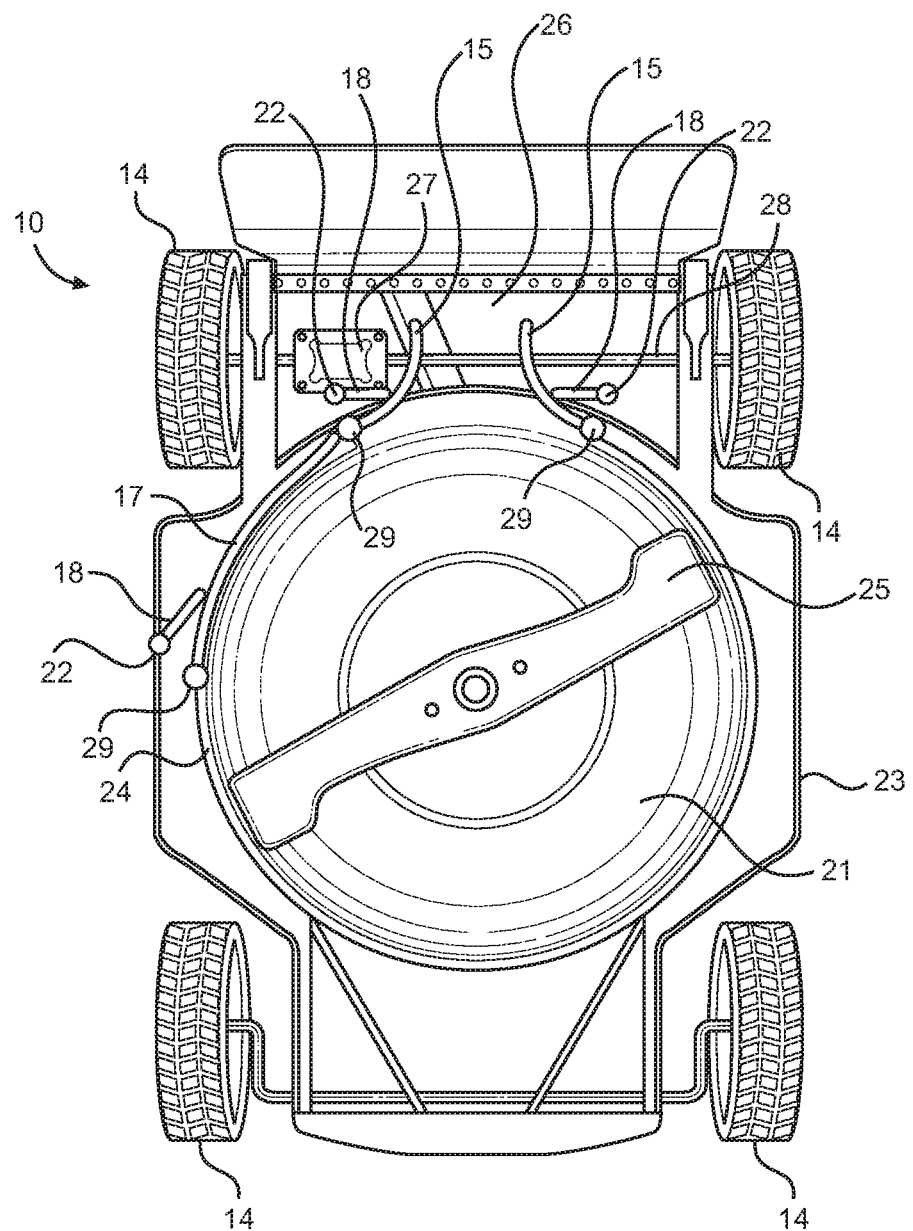
FIG. 2 is a bottom view of the lawnmower of FIG. 1.

FIG. 1 is a perspective view of an example of a lawnmower 10, and specifically a walk-behind lawnmower, made in accordance with principles of the disclosed subject matter. FIG. 2 is a bottom view of the lawnmower of FIG. 1. The lawnmower 10 can include a cutter housing 11 which can also be referred to as a deck or as a mower deck or as a cutter deck of the lawnmower 10. A prime mover 12 can be attached to the cutter housing 11. The prime mover 12 can be in the form of or include an internal combustion engine or an electric motor, for example. The prime mover 12 can be attached to a mounting portion 19 of the cutter housing 11 using an engine mount, bosses, mechanical fasteners, and/or other mechanical devices. The mounting portion 19 of the exemplary embodiment of FIG. 1 can surround an opening at a central portion of the cutter housing 11, and can include a plurality of mounting holes spaced around the opening. The prime mover 12 can drive a driveshaft that supports at least one blade. The blade(s) can rotate in a cutting chamber 24 defined by the cutter housing 11 and opened toward the ground. In operation of the lawnmower, the prime mover 12 rotates the driveshaft, which, in turn, rotates the blade. As a result, the lawnmower 10 can perform a mowing operation on vegetation, such as to mow a lawn.

As shown in FIG. 1, the lawnmower 10 can include a steering handle 13 and a plurality of wheels 14. The steering handle 13 can be used by a user to operate the lawnmower 10 and guide the path of travel of the lawnmower 10. The steering handle 13 can include or be associated with various control mechanisms. For example, the control mechanisms can include speed controls for self-propelled lawnmowers, safety stop levers or bars, which the user must depress or hold to maintain the lawnmower in a running state, a mulch/discharge lever control lever or button, etc.

The lawnmower 10 can also include a discharge chute and a collection bag 16. The discharge chute can be located at the rear of the cutter housing 11 and adjacent to the wheel 14 at the right rear of the cutter housing 11, for example. The discharge chute can be oriented to discharge the vegetation clippings toward the side of the lawnmower 10 or toward the rear of the lawnmower 10. In the exemplary embodiment of FIG. 1, the discharge chute can discharge the clippings toward the rear of the lawnmower 10. When the lawnmower 10 is in a discharging mode, lawn clippings, for example, can be propelled from the cutting chamber 24, in which blade(s) 25 spins and in which vegetation is cut by the spinning blade(s), of the lawnmower 10 into the discharge opening and through a discharge chute. The clippings can pass through the discharge chute and into the collection bag 16. Once the collection bag 16 is filled with lawn clippings, or at any other time, the collection bag 16 can be emptied. Alternatively, the collection bag 16 can be removed from the lawnmower 10, and the lawnmower 10 can discharge the clippings through the discharge chute and onto the ground.

As shown in FIG. 2, the lawnmower 10 can include a blade 25. Additionally, the lawnmower 10 can include gearbox 27 connected to the prime mover 12 to drive rear axle 28. The cutter housing 11 can include a top wall 21 and one or more sidewalls 23 that extend downward from the top wall 21 and toward the ground. The top wall 21 can be demarcated from the sidewalls 23 by the top wall 21 having a substantially horizontal disposition and the sidewall(s) 23 having a substantially vertical disposition. The top wall 21 can be demarcated from the sidewall(s) 23 by being constructed of respective parts and/or being separated by a particular feature of the lawnmower, such as a distinct bend or ridge. The top wall 21 can be integrally formed with the sidewall(s) 23. For example, the top wall 21 and the sidewall(s) 23 can be integrally formed of stamped or cast metal or of molded plastic construction.

A first plate 15 and a second plate 17 can be attached to the mower housing 11 by rotational spring hinges 29. In addition, actuation arms 18 can also be rotationally connected to the mower housing 11 by motorized spring hinges 22. Thus, the actuation arms 18 can be controllably rotated to contact respective first plate 15 and second plate 17 to cause the plates 15 and 17 to move closer and farther away from the blade 25. This movement allows the plates 15 and 17 to create a larger or smaller space or chamber through which grass or other clippings can be channeled. In this manner, the lawnmower can be move from a total mulch mode to a total discharge mode and hybrid or interim positions therebetween. For example, when plates 15 and 17 are in a closest position to the blade 25, the lawnmower 10 is considered to be in the full much mode, and when the plates 15 and 17 are in a furthest position to the blade 25, the lawnmower 10 is considered to be in the full discharge mode. In the discharge mode, the clippings are sent through channels formed by a space between the blade 25 and plates 15 and 17 and finally into a discharge chute 26. In much mode, the plates 15 and 17 can conform with other walls that form the cutting chamber 24 to keep clippings circling within the cutting chamber for additional cutting/mulching and finally dispensed onto the ground. Each of the spring hinges 22, 29 can be formed in various manners, such as biased return hinges, motorized hinges, simple hinges with an exterior motor or biasing device to cause motion of the attached arm 18 or plate 15, 17, etc.

Figure 3:
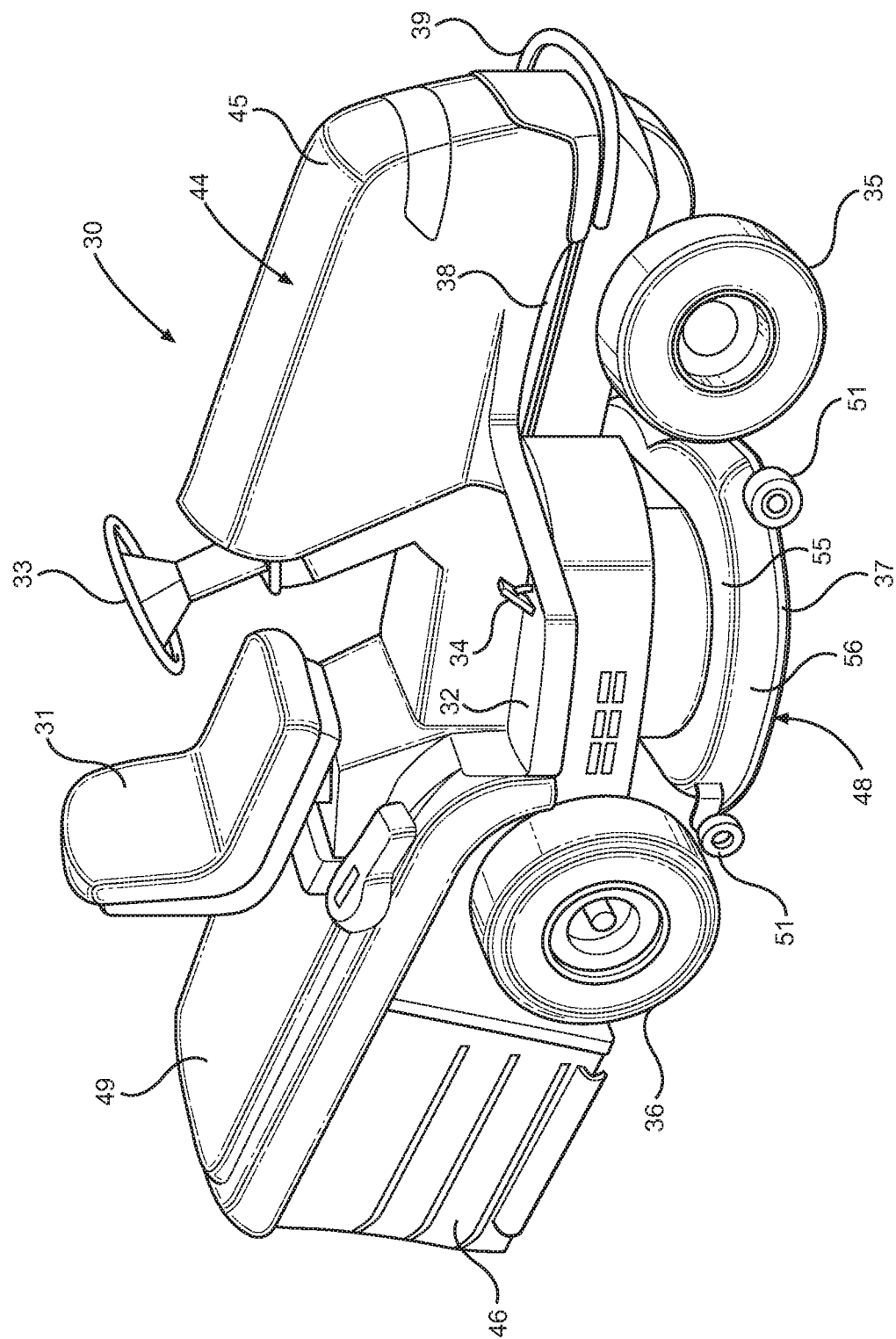
FIG. 3 is a perspective view of another embodiment of a lawnmower made in accordance with principles of the disclosed subject matter.

FIG. 3 is a perspective view of a further lawnmower 30 in accordance with one or more embodiments of the disclosure. The lawnmower 30 can be in the form of a riding lawnmower or a garden tractor. An operator can be supported by a seat 31 and one or more foot supports 32 of the lawnmower.

The operator can control movement of the lawnmower 30 on a lawn, terrain, or other surface via a steering wheel or other steering mechanism 33, one or more control pedals 34, and other control mechanisms. The control pedals 34 can be provided on or adjacent to the foot supports 32 of the lawnmower 30. For example, a control pedal 34 can be provided to control travel speed of the lawnmower 30 and/or whether the lawnmower 30 moves in a forward direction or reverse direction. The lawnmower 30 can include the front wheels 35 and rear wheels 36.

Figure 4:
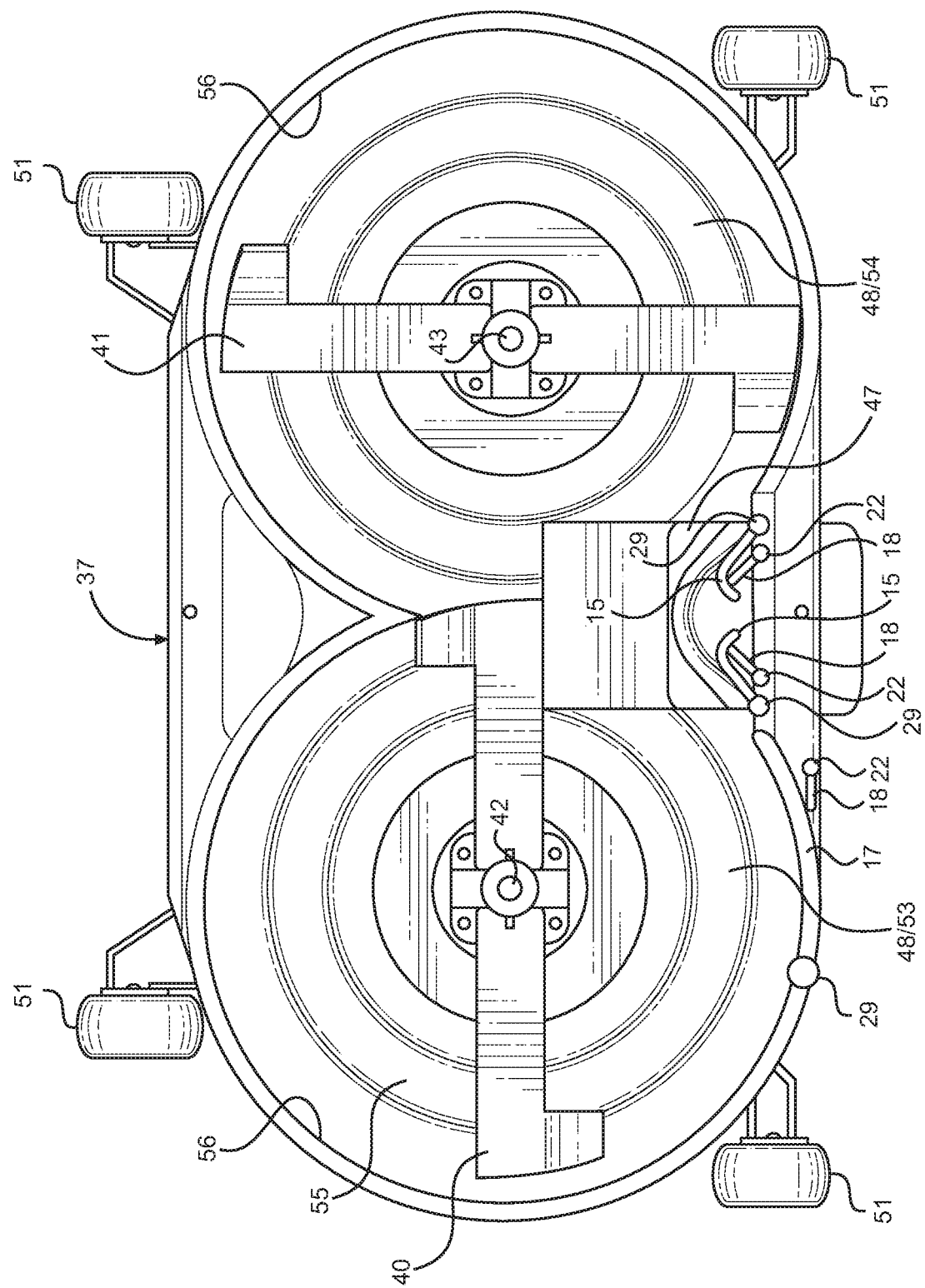
FIG. 4 is a bottom view of the lawnmower of FIG. 3.

The lawnmower 30 can include a cutter housing 37, also referred to as a deck or a mower deck or a cutter deck of the lawnmower 30. The cutter housing 37 can support one or more blades 40, 41 as shown in FIG. 4. The blade(s) can rotate in a cutting chamber 48 defined by the cutter housing 37 and opened toward the ground. In operation of the lawnmower 30, the prime mover 38 can rotate a driveshaft that can be mechanically connected to the one or more blades 40, 41, such as by first driven shaft 42 and second driven shaft 43, so as to rotate the one or more blades. As a result, the lawnmower 30 can perform a mowing operation on vegetation, which can include or be in the form of a lawn. For example, the prime mover 38 can be in the form of a gasoline engine or an electric motor. The prime mover 38 can also power the one or more wheels 35, 36 of the lawnmower, as controlled by the operator.

The lawnmower 30 can include a frame or chassis 39. The frame 39 can provide a main supporting structure of the lawnmower 30 to which various components of the lawnmower 30 are attached. The wheels 35, 36 can be attached to axles that in turn can be attached to the frame 39 of the lawnmower. The prime mover 38 can be attached to the frame 39 and mechanically connected to the powered wheels so as to power the lawnmower 30. As described above, the prime mover 38 can also power the one or more blades 40, 41 in the cutter housing 37, such as by using a blade drive assembly. For example, a mower driveshaft or power take-off can be powered by the prime mover and supported by the prime mover and/or the frame. The motor driveshaft can, in turn, support a driving pulley. Each of the blades that are provided in the cutter housing 37 can be supported by a respective driven shaft. Such driven shaft can be rotatably supported by the cutter housing 37 such as by using a bearing arrangement. The driven shaft can extend above the cutter housing 37 and support a driven pulley. The driving pulley(s) (powered by the prime mover) can power the driven pulley (so as to power the mower blade) in a selective manner. For example, the driving pulley(s) can be selectively engaged or disengaged with the driven pulley so as to selectively power the driven pulley. Such engagement and disengagement can be provided by selective tightening or loosening of a belt that extends around both the driving pulley and the driven pulley. Such tightening or loosening of the belt can be controlled by position of an engagement pulley or idler pulley, which can be controlled by the operator in some manner, such as by a lever. The engagement pulley can be movably positioned on the frame 39 so as to be moved between a first position and a second position. In the first position, the belt can be tight around both the driving pulley and the driven pulley, i.e. so as to operatively engage the driving pulley with the driven pulley, and so as to operatively rotate the particular blade attached to such driven pulley. In the second position, the belt can be loose or slack around the driving pulley and/or the driven pulley, i.e., so as to disengage the driving pulley with the driven pulley.

The frame of the lawnmower can also support a body 44 of the lawnmower 30. The body 44 can provide an outer, finished surface that can cover the frame 39, prime mover 38, and other components or portions of components of the lawnmower 30. The body 44 can include an engine hood 45. The engine hood 45 can cover at least a portion of the prime mover 38, as described above, which can be in the form of a gasoline engine. The foot support(s) 32, as described above, can be integrally formed and/or supported by the body 44 of the lawnmower 30.

The lawnmower 30 can also include a collection bag 46. The collection bag 46 can be supported by the frame 39 of the lawnmower. The collection bag 46 can be supported by rods or other structural supports that extend rearwardly from a portion of the frame 39 above or adjacent to the rear wheels 36. A discharge opening and/or passageway 47 can be provided to transfer clippings from a cutting chamber 48 to the collection bag 46 when the lawnmower 30 is in a discharge mode. The body 44 of the lawnmower 30 can include a collection bag cover 49 that is positioned over and/or covers the collection bag 46.

The lawnmower 30 can include a lift assembly, i.e. a cutter housing lift assembly that controls height of the cutter housing 37. The height of the cutter housing 37 can be controlled so as to be positioned between a raised position and a lowered position. In the raised position, the cutter housing 37 with blades can be positioned so as to provide a "long cut" to a lawn. In the lowered position, the cutter housing 37 with blades can be positioned so as to provide a "short cut" into the lawn. Various interim positions, between the raised position and the lowered position, can be provided. The height of the cutter housing 37 can be controlled by the human operator riding on the lawnmower 30, such as by a lever, for example.

The cutter housing 37 can be provided with housing wheels or housing rollers 51. A housing roller 51 can be provided at or adjacent to a rear of the cutter housing 37. A housing roller 51 can be provided at or adjacent to a front of the cutter housing 37. Housing rollers 51 can be provided on both the left and right sides of the cutter housing. The housing rollers 51 can limit how close the cutter housing 37 or particular portion of the cutter housing 37 gets into the lawn. Illustratively, if the lawnmower passes over a bump or high point in a lawn, the housing wheel(s) 51 can engage the bump so as to prevent "scalping" of the lawn and/or so as to prevent the blades of the lawnmower 30 from engaging with the earth of the lawn. The particular position and number of the housing rollers or housing wheels 51 can be varied as desired.

FIG. 4 is a bottom view of a cutter housing 37 including a first cutting chamber 53 and a second cutting chamber 54. In other arrangements, additional cutting chambers can be provided. The first cutting chamber 53 houses a first blade 40. The second cutting chamber 54 houses a second blade 41. The first blade 40 and the second blade 41 can be driven, so as to cut grass or other vegetation, as described above.

FIG. 4 illustrates a synchronous cutter housing layout. In a synchronous cutter housing layout, rotation of the first blade 40 is synchronized with rotation of the second blade 41. This synchronization of the two cutting blades 40, 41 can be performed by mechanically connecting the first blade 40 to the second blade 41, such as by utilizing a timing belt or synchronous belt or other similar arrangement. In the illustrated synchronous cutter housing layout, the inner rotational path of an outer edge of the first blade 40 will pass over the inner rotational path of an outer edge of the second blade 41, i.e. so as to provide crossover of the two blades 40, 41. Accordingly, synchronized rotation of the first blade 40 with rotation of the second blade 41 can occur such that the two blades do not collide or interfere with each other. Such crossover of the two blades 40, 41 can be desired so as to provide effective cutting coverage of the lawn.

The cutter housing 37 can include a top wall 55 and one or more sidewalls 56 that extend downward from the top wall 55 and toward the ground. The top wall 55 can be demarcated from the sidewall(s) 56 by the top wall 55 having a substantially horizontal disposition and the sidewalls 56 having a substantially vertical disposition. The top wall 55 can be demarcated from the sidewall(s) 56 by being constructed of respective parts and/or being separated by a particular feature of the lawnmower 30, such as a distinct bend or ridge in the cutter housing. The top wall 55 can be integrally formed with the sidewall(s) 56. The top wall 55 and the sidewall(s) 56 can define the multiple cutting chambers 48 of a particular cutter housing 37, such as the first cutting chamber 53 and the second cutting chamber 54 shown in FIG. 4. The top wall 55 and the sidewall(s) 56 can be integrally formed of stamped or cast metal or of molded plastic construction.

The cutter housing 37 shown in FIG. 4 can include a rear discharge layout. That is, a discharge opening 47 can be provided in the cutter housing 37. In operation, lawn clippings can be ejected from the first cutting chamber 53 and/or the second cutting chamber 54 through the discharge opening 47 and into a passageway that communicates with the collection bag 46. Accordingly, lawn clippings can be ejected from the cutting chambers 48, including the first cutting chamber 53 and the second cutting chamber 54, and passed to the collection bag. The collection bag 46 can then be emptied at a point in time as may be desired. It is appreciated that the size and particular positioning of the discharge opening 47 can be varied as may be desired.

Similar to the embodiment of FIG. 2, a first plate 15 and a second plate 17 can be attached to the cutter housing 37 by rotational spring hinges 29. In addition, actuation arms 18 can also be rotationally connected to the cutter housing 37 by motorized spring hinges 22. Thus, the actuation arms 18 can be controllably rotated to contact respective first plate 15 and second plate 17 to cause the plates 15 and 17 to move closer and farther away from the blade 40 and/or 41. This movement allows the plates 15 and 17 to create a larger or smaller space or chamber through which grass or other clippings can be channeled. In this manner, the lawnmower 30 can move from a total mulch mode to a total discharge mode and to a hybrid/interim mode that includes interim positions between the mulch mode and discharge mode. For example, when plates 15 and 17 are in a closest position to the blades 40, 41, the lawnmower 30 is considered to be in the full much mode, and when the plates 15 and 17 are in a furthest position to the blades 40, 41, the lawnmower 30 is considered to be in the full discharge mode. In the discharge mode, the clippings are sent through channels formed by a space between the blades 40, 41 and plates 15, 17 and finally into discharge chute 47. In much mode, the plates 15 and 17 can conform with other walls that form the cutting chambers 53, 54 to keep clippings circling within the cutting chamber 53, 54 for additional cutting/mulching and for finally for dispensing the clippings onto the ground. Each of the spring hinges 22, 29 can be formed in various manners, such as biased return hinges, motorized hinges, simple hinges with an exterior motor or biasing device to cause motion of the attached arm 18 or plate 15, 17, etc.

Figure 5:
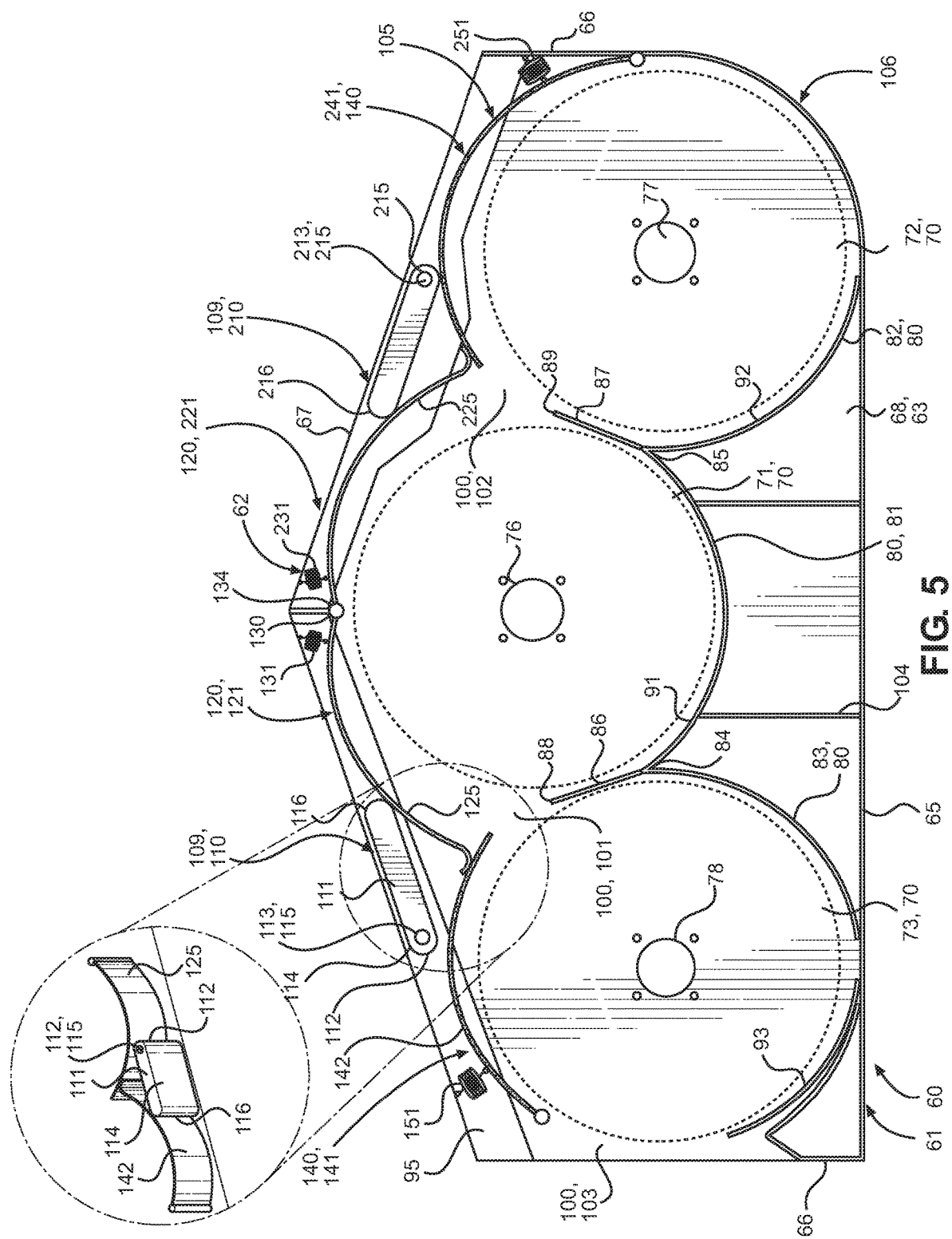
FIG. 5 is a schematic bottom view of a cutter housing assembly made in accordance with principles of the disclosed subject matter, with a conversion assembly in a discharge mode.

FIG. 5 is a bottom view of a cutter housing 61, which can be part of a cutter housing assembly 60. The cutter housing 61 includes a plurality of cutting chambers 70, which include a first cutting chamber 71, a second cutting chamber 72, and a third cutting chamber 73. The first cutting chamber 71 can be provided between the second cutting chamber 72 and the third cutting chamber 73. The cutting chambers 71, 72, 73 can be demarcated or defined by housing walls 62 and/or chamber walls 80. The housing walls 62 can include a top wall 63, a rear wall 65 and a front wall 67, as well as side walls 66. The top wall 63 can include an underside 68. The chamber walls 80 can include a first chamber wall 81, a second chamber wall 82, and a third chamber wall 83. The first chamber wall 81 can serve to demarcate, at least in part, the first cutting chamber 71. The second chamber wall 82 can serve to demarcate, at least in part, the second cutting chamber 72. The third chamber wall 83 can serve to demarcate, at least in part, the third cutting chamber 73. The first chamber wall 81 can be connected to the second chamber wall at a first joint 84. The second chamber wall 82 can be connected to the third chamber wall at a second joint 85. Various reinforcing structure or flanges 104 can be provided in the cutter housing 61.

The chamber walls 80 can include or be comprised of one or more structures. The first chamber wall 81, of the center cutting chamber can include a first shared wall 86. The first shared wall 86 can include an end 88. The first shared wall 86 can provide an extension or further wraparound for the first cutting chamber 71. The first shared wall 86 can be shared with the third cutting chamber 73. Accordingly, the third chamber wall 83 can also include the first shared wall 86.

The first chamber wall 81 of the center cutting chamber can also include a second shared wall 87. The second shared wall 87 can include an end 89. The second shared wall 87 can provide an extension or further wraparound for the first cutting chamber 71. The second shared wall 87 can be shared with the second cutting chamber 72. Accordingly, the second chamber wall 82 can include the second shared wall 87.

The first chamber wall 81 can include a first chamber wall surface 91 that includes an inner surface of the first chamber wall 81. The first chamber wall surface 91 can include an overall curved interior surface, which can include curved, concave sections as well as linear or flat sections that can be conducive to effective airflow within the first cutting chamber 71.

The second chamber wall 82 can include a second chamber wall surface 92 that can include an inner surface of the second chamber wall 82. The second chamber wall surface 92 can include an overall curved interior surface, which can include curved, concave sections as well as linear or flat sections that can be conducive to effective airflow within the second cutting chamber 92.

The third chamber wall 83 can include a third chamber wall surface 93 that can include an inner surface of the third chamber wall 83. The third chamber wall surface 93 can include an overall curved interior surface, which can include curved, concave sections as well as linear or flat sections that can be conducive to effective airflow within the third cutting chamber 73.

Each of the cutting chambers 71, 72, 73 can be provided with a respective bearing hole 76, 77, 78 that provides a securement structure to support a respective rotating blade. The rotating blades can include a first blade, a second blade, and a third blade. Each of the rotating blades can be supported by a shaft with associated respective pulley, such as pulleys 96, 97, 98 shown in FIG. 10. The shaft can be pivotably supported by a bearing housing that is provided in in a respective bearing hole 76, 77, 78 located in the top wall 63 of the cutter housing 61. Each of the shafts can be mechanically powered by the prime mover of the particular lawnmower, in conjunction with a mechanical power transfer arrangement, such as a pulley(s) and belt arrangement as described above, or other structure/mechanism.

The cutter housing 61 can include a front wall 67, as described above, as well as a front lower flange 95. The front lower flange 95 can extend along a front extent of the cutter housing 61. The front lower flange 95 can extend inwardly and horizontally from the front wall 67 of the cutter housing 61. The front lower flange 95, front wall 67, and top wall 63 can collectively form a channel to add structural support to the cutter housing 61.

The cutter housing 61 can include a side discharge layout having a third discharge opening 103 on the left-hand side. From a bottom view, as shown in FIG. 5, blades of the cutter housing 61 can spin in a counterclockwise manner. As a result, lawn clippings can be propelled, due to the airflow within the cutter housing 61, along the front wall 67 of the cutter housing 61 and towards the third discharge opening 103. The cutter housing 61 can include a plurality of discharge openings 100. The discharge openings 100 can include first discharge opening 101 and a second discharge opening 102, as well as the third discharge opening 103. The first discharge opening 101 can provide an exit for lawn clippings and other debris from the first cutting chamber 71, i.e. the center cutting chamber. The second discharge opening 102 can provide an exit for lawn clippings and other debris from the second cutting chamber 72, i.e. the most interior cutting chamber from the third or external discharge opening 103. Accordingly, in a discharge mode, lawn clippings generated in the second cutting chamber 72 will pass through the second discharge opening 102, through the first discharge opening 101, and finally through the third discharge opening 103 so as to exit from the cutter housing 61. In a discharge mode, lawn clippings generated in the first cutting chamber 71 will pass through the first discharge opening 101 and through the third discharge opening 103 so as to exit from the cutter housing 61. In a discharge mode, lawn clippings generated in the third cutting chamber 73 will pass through the third discharge opening 103 so as to exit from the cutter housing 61.

The cutter housing 61 is an asynchronous cutter housing layout of a mower deck. A center blade can be positioned, in a longitudinal direction of the lawnmower, in front of both of the side blades. Thus, in the arrangement there may be cross-over of the center blade with one or more of adjacent or side blades along a longitudinal axis of the lawnmower. However, because the center blade is positioned in front of the adjacent or side blades, the blades do not interfere with each other in rotation. Accordingly, in such an arrangement it may not be needed to time or synchronize the blades relative to each other.

As described above, a lawnmower of the disclosure can include a lift assembly, i.e. a cutter housing lift assembly that controls height of the cutter housing or deck. The height of the cutter housing 61 can be controlled so as to be positioned between a raised position and a lowered position, as well as positioned in interim positions between the raised position and the lowered position. The height of the cutter housing 61 can be controlled by a lever that is manipulated by the operator of the particular lawnmower.

The cutter housing assembly 60 can include conversion assembly 105. The conversion assembly 105 permits the cutter housing 61 to be placed into multiple different configurations, including a discharge mode 106, a mulch mode 107, and partial mulch or interim mode(s) 108, which can be controlled by a user or operator of the lawnmower. The particular position can be controlled via a controller, on a control panel of the lawnmower, or by a mechanical arrangement, for example.

The conversion assembly 105 can include one or more plates. For example, first and second primary plates 121, 221 and first and second secondary plates 141, 241 can be provided. In the discharge mode, the plates can be positioned so that the first discharge opening 101 and the second discharge opening 102 are opened. In the mulch mode 107, such plates can be positioned so that the first discharge opening 101 and the second discharge opening 102 are closed, or mostly closed (closed enough to induce full mulching). The first primary plate 121 and the first secondary plate 141 can be opened, to provide discharge, on one side in conjunction with the second primary plate 221 and the second secondary plate 241 closed, to provide mulching, on the other side. The first primary plate 121 and the first secondary plate 141 can be closed, to provide mulching, on one side in conjunction with the second primary plate 221 and the second secondary plate 241 open, to provide discharge, on the other side. Hereinafter, the conversion assembly 105 will be described in further detail.

A cutter housing assembly 60 can include a cutter housing 61 as described above. The cutter housing 61 can include a first cutting chamber 71 with a first discharge opening 101. In some embodiments of the disclosure, the first cutting chamber 71 can be a center cutting chamber. The cutter housing assembly 60 can further include a first rotation arm 110 pivotably attached to the cutter housing 61. The rotation arm 110 can engage with and cause the first primary plate 121 to rotate. In turn, the primary plate 121 can engage with the secondary plate 141 so as to rotate the secondary plate 141.

The primary plate 121 can be rotatable between the discharge mode 106 and a mulch mode 107. In the discharge mode 106, the primary plate 121 can be positioned to provide a first gap associated with the first discharge opening. In the mulch mode 107, the primary plate can be positioned to provide a decreased gap, relative to the first gap, associated with the first discharge opening. Accordingly, the gap that is associated with the first discharge opening, of the first cutting chamber 71, can be decreased (from the discharge mode 106) so as to provide the mulch mode 107. In other words, a gap provided between the first cutting chamber 71 and the third cutting chamber 73 can be decreased so as to provide the mulching mode. As such gap is decreased more and more, more and more mulching can be provided.

A first rotation actuator 156 can be provided to engage with the rotation arm 110 and to cause rotation of the rotation arm 110. For example, the first rotation actuator 156 can include a motor 159 with gear arrangement or assembly 158. The rotation arm 110 can engage with the primary plate 121 so as to rotate the primary plate in conjunction with rotation of the rotation arm. Accordingly, the primary plate can be rotated between the discharge mode 106 and the mulch mode 107, as well as of variety of partial mulch modes 108, as may be desired.

The cutter housing assembly can also include a first secondary plate 141. The secondary plate 141 can be pivotably attached to the cutter housing 61 and selectively rotatable between the discharge mode and the mulch mode. In the discharge mode, the secondary plate 141 can be positioned to provide a first gap associated with the first discharge opening 101. In the mulch mode, the secondary plate 141 can be positioned to provide a decreased gap, relative to the second gap, associated with the first discharge opening. The primary plate 121 and the secondary plate 141 can be rotated to the mulch mode 107 so as to block (or mostly block) the first discharge opening 101. In conjunction with such rotation, the primary plate 121 can be moved into position so as to provide and/or complete an interior mulching cavity of the first cutting chamber 71. In conjunction with such rotation, the secondary plate 141 can be moved into position so as to provide and/or complete an interior mulching cavity of the third cutting chamber 73. Relatedly, the primary plate 121 can be curved so as to complement and/or be continuous with the first chamber wall 81. The secondary plate 141 can be curved so as to complement and/or be continuous with the third chamber wall 83.

Accordingly, the primary plate 121 can include a curvature that is opposite or opposed to the curvature of the secondary plate 141.

The secondary plate 141 can be rotated as a result of engagement with the primary plate 121. That is, the primary plate 121 can be engageable with the secondary plate 141 so as to pivot the secondary plate 141 between the mulch mode and the discharge mode.

The rotation arm 110, i.e. a first rotation arm of a pair of rotation arms 109, can include an arm body 111. The arm body 111 can include a connection end 112 and a push end 116. The connection end 112 can be pivotably attached to the cutter housing 61. The connection end 112 can include a pin aperture 113. The pin aperture 113 can receive a drive pin 115. The drive pin 115 can be affixed to a pin barrel 114 at the connection end 112. The pin barrel 114 can be in the form of a knuckle or housing to support the drive pin 115. The drive pin 115 can be driven or controlled by a rotation actuator 156. The drive pin 115 can extend above the top wall 63 of the cutter housing 61. The drive pin 115 can be rotatably supported by a housing pin support 118. The drive pin 115 can be solely supported by the housing pin support 118 in that a lower end of the drive pin 115 can be unsupported. Alternatively, a bearing or aperture can be provided in the front lower flange 95 so as to support a lower end of the housing pin support 118. The rotation actuator 156 can also be positioned or attached to the top wall 63 of the cutter housing 61. The rotation actuator 156 can include a gear assembly 158 and/or motor or motor assembly 159 that is affixed to an upper end of the drive pin 115 so as to impart rotation to the drive pin 115. For example, a pinion gear 157 can be welded to the top of the drive pin 115 and driven by a motor or other power mechanism 159. Alternate embodiments of the actuator 156 can include a belt drive.

Figure 12:
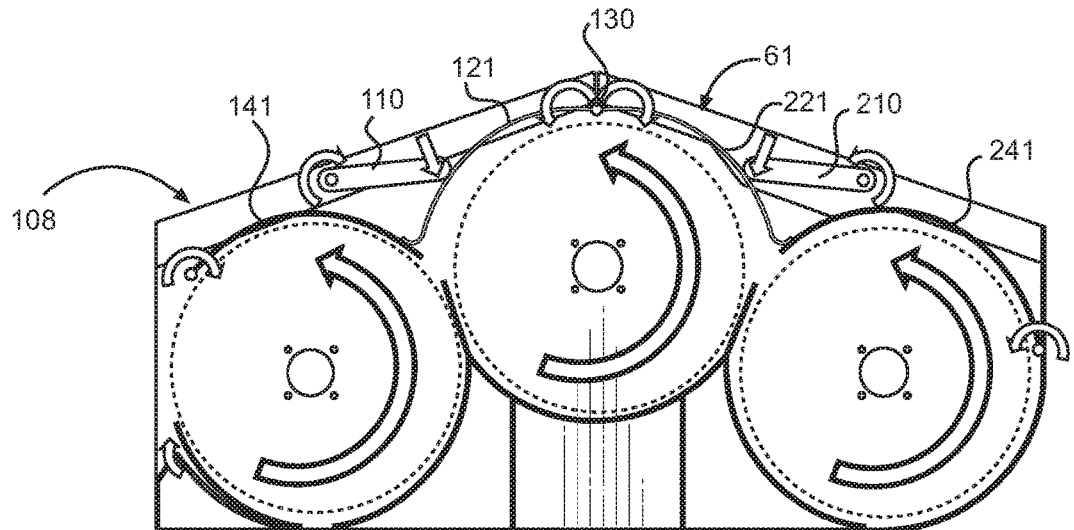
FIG. 12 is a schematic top view of the cutter housing assembly of FIG. 5, with conversion assembly in a partial mulch mode.

The rotation arm 110 can also include push end 116. The connection end 112 and the push end 116 can constitute opposing ends of the arm body 111. The push end 116 of the first rotation arm 110 can engage with the primary plate 121, so as to rotate the primary plate 121. The push end 116 of the rotation arm 110 can engage with the primary plate 121 in a slide-press type actuation. The slide-press actuation can include the rotation arm 110 sliding along an outer surface 126 of the primary plate 121 as the rotation arm 110, at the push end 116 thereof, presses the primary plate 121 to change between the discharge mode 106 and the mulch mode 107. Relatedly, the primary plate 121 can be biased toward the discharge mode 106 by a suitable spring, such as a spring 131 as described below. Accordingly, as shown in FIG. 5, the rotation arm 110 can be rotated clockwise so as to engage and apply pressure to the primary plate 121. As the rotation arm 110 rotates the primary plate 121, the rotation arm 110 can slide along the primary plate 121 so as to render the arrangements shown in FIG. 12 and FIG. 13. That is, clockwise rotation of the rotation arm 110 can impart rotation to the primary plate 121 to a point at which the rotation arm 110 is perpendicular or substantially perpendicular to the primary plate 141. A suitable controller 160 with sensors can be utilized so as to constrain or limit rotation of the rotation arm 110, as well as the rotation arm 210 described below, which can be connected to the controller 160 via control wires 161. In particular, rotation of the rotation arm 110 can be controlled so as to provide desired positioning of the primary plate 121 along the first chamber walls or wall 81. Such desired positioning of the primary plate 121 can provide a continuous or substantially continuous circular inner mulch surface that includes an inner chamber surface 125, of the primary plate 121, and first chamber wall surface 91.

Sensors and/or feedback may be used with other rotating components described herein.

The primary plate 121 can include a primary plate body 122. The primary plate body 122 can include an upper edge 123 and a lower edge 124. The upper edge 123 can be provided with sufficient clearance, with respect to the underside 68 of the cutter housing 61, so as to freely rotate in operation. The lower edge 124 can be provided to be at the same height or substantially the same height as a lower edge of the chamber walls 80. The primary plate body 122 can include the inner chamber surface 125 as described above. The primary plate body can include an outer surface 126. The rotation arm 110 can engage with such outer surface 126, as described above. The outer surface 126 can be constructed of suitable material or surface preparation such as paint, grease, or other mechanism so as to provide engagement that is conducive to the rotation arm 110 sliding across the primary plate 121 in conjunction with the rotation arm 110 imparting rotation to the primary plate 121.

The primary plate body 122 can include a connection end 127 and a push end 132. The connection end 127 can include structure to pivotally attach to the cutter housing 61. The connection end 127 can include a pin barrel or housing 128, which includes a pin aperture 129. A primary plate pin 130 can extend through and be positioned in the pin aperture 129. Accordingly, the primary plate pin 130 can rotatably support the primary plate 121. The cutter housing 61, in the top wall 63, can include a pin receiving aperture or hole 134 so as to pivotably support the primary plate pin 130. The pin receiving aperture 134 can include suitable bearing structure and/or other structure so as to stably support the primary plate 121. The primary plate pin 130 can be supported at a lower end by a lower pin receiving aperture. The lower pin receiving aperture can be provided on or a part of the front lower flange 95. In the situation that only one pin receiving aperture is provided, such single aperture can be provided with sufficient structural strength to support the primary plate 121, and to withstand possible torque forces experienced by the primary plate 121. The primary plate pin 130 can be non-rotatably affixed to the cutter housing 61 and the primary plate pin 130 can be rotatably disposed in the pin barrel 128. Alternatively, the primary plate pin 130 can be non-rotatably affixed to the pin barrel 128 in conjunction with the primary plate pin 130 being rotatably disposed in holes, apertures or bearings in the cutter housing 61. In lieu of the primary plate pin 130, the connection end 127 (of the primary plate 121) can be provided with protuberances or integrally formed pin structure so as to engage with a receiving aperture in the cutter housing 61.

The push end 132 of the primary plate 121 can be rounded and smooth so as to provide effective slide-press actuation against the secondary plate 141. That is, the push end 132, in rotation thereof, can press against and slide across an outer surface 146 of the secondary plate 141. The push end 132 can also include a curl flange 133. The curl flange 133 can provide the rounded and smooth structure so as to provide effective slide-press actuation of the primary plate 121 against the outer surface 146 of the secondary plate 141.

The primary plate 121 can include or be provided with a primary plate spring 131, as described above. The primary plate 121 can be biased toward the discharge mode 106 by the primary plate spring 131, which can include or be a coil spring, linear spring, extension spring tension spring, or torsion spring, for example. A first end of primary plate spring 131 can be attached to or abutted against the cutter housing 61 with the other end of the primary plate spring 131 attached to or abutted against the primary plate 121, which can impart the clockwise rotational bias to the primary plate 121. Accordingly, the primary plate 121 can be biased into contact with the rotation arm 110 both (1) as the rotation arm 110 is pushing to slide-press actuate the primary plate 121 to the mulch mode 107, and (2) as the rotation arm 110 is retracting so as to slide-press actuate the primary plate 121 from the mulch mode 107 to the discharge mode 106. That is, as the end or push end 116 of the rotation arm 110 is being retracted (due to the counterclockwise rotation of the rotation arm 110, as shown in FIG. 5) a press and slide relationship is maintained due to the clockwise bias of the primary plate 121.

As described above, the secondary plate 141 can be rotated as a result of engagement with the primary plate 121. That is, the primary plate 121 can be engageable with the secondary plate 141 so as to pivot the secondary plate 141 between the mulch mode and the discharge mode.

The secondary plate 141 can include a secondary plate body 142. The secondary plate body 142 can include in upper edge 143 and a lower edge 144. The upper edge 143 can be provided with sufficient clearance, with respect to the underside 68 of the cutter housing 61, so as to freely rotate in operation. The lower edge 144 can be provided to be at the same height or substantially the same height as a lower edge of the chamber walls 80. The secondary plate body 142 can include an inner chamber surface 145. The secondary plate body 142 can include an outer surface 146. The primary plate 121, and specifically the push end 132 of the primary plate 121, can engage with such outer surface 146 so as to rotate the secondary plate 141. The outer surface 146 can be constructed of suitable material, surface preparation, paint, grease, or other mechanism so as to provide engagement that is conducive to the primary plate 121 sliding across the secondary plate 141 in conjunction with the primary plate 121 and impart rotation to the secondary plate 141, i.e. to provide slide-press actuation of the primary plate 121 acting upon the secondary plate 141. The secondary plate body 142 can include a connection end 147 and a wall engagement end 152. The connection end 147 can include structure to pivotally attach to the cutter housing 61. The connection end 147 can include a pin barrel or housing 148. The pin barrel can include a pin aperture 149. A secondary plate pin 150 can extend through and be positioned in the pin aperture 149. Accordingly, the secondary plate pin 150 can rotatably support the secondary plate 141. The cutter housing 61, in the top wall 63, can include a pin receiving aperture or hole 154 so as to pivotably support the secondary plate pin 150. The pin receiving aperture 154 can include suitable bearings structure and/or other structure so as to stably support the secondary plate 141. The secondary plate pin 150 can be non-rotatably affixed to the cutter housing 61 in conjunction with the secondary plate pin 150 being rotatably disposed in the pin barrel 148. The secondary plate pin 150 can be non-rotatably affixed to the pin barrel 158 in conjunction with the secondary plate pin 150 being rotatably disposed in an aperture, holes, or bearings in the cutter housing 61. In lieu of the secondary plate pin 150, the connection end 147 (of the secondary plate 141) can be provided with an integrally formed pin, for example, so as to engage with a receiving aperture or bearing in the cutter housing 61.

The secondary plate 141 can include a wall engagement end 152 as described above. The wall engagement end 152 can be constructed and of spatial relationship so as to engage, when in the mulch mode 107, with an end 88 of the first chamber wall 81, as illustrated in FIG. 5. The wall engagement end 152 can be a blunt end. The wall engagement end 152 can be curved or notched in some manner so as to match or meet with the end 88 of the first chamber wall 81, which can include the first shared wall 86.

The secondary plate 141 can include a secondary plate spring 151. The secondary plate 141 can be biased towards the discharge mode 106 by the secondary plate spring 151. The secondary plate spring 151 can include or be a coil spring, linear spring, extension spring, tension spring or torsion spring, for example. A first end of the secondary plate spring 151 can be attached to or abutted against the cutter housing 61 with the other end of the secondary plate spring 151 attached to or abutted against the secondary plate 141, which can impart the counterclockwise rotational bias of the secondary plate 141. Accordingly, the secondary plate 141 can be biased into contact with the primary plate 121 both (1) as the primary plate 121 is pushing to slide-press actuate the secondary plate 141 to the mulch mode 107, and (2) as the primary plate 121 is retracting so as to slide-press actuate the secondary plate 141 from the mulch mode 107 to the discharge mode 106. That is, as the push end 132 of the primary plate 121 is being retracted (due to the clockwise rotation of the primary plate 121, as shown in FIG. 5) a press and slide relationship is maintained (between the primary plate 121 and the secondary plate 141) due to the counterclockwise bias of the secondary plate 141.

Various features of a conversion assembly 105 are described above including a first rotation arm 110, a first primary plate 121, and a first secondary plate 141. Such components can provide a mechanism so as to control or limit the passage of lawn clippings and other debris through the first discharge opening 101.

The first primary plate 121 can be part of a primary plate assembly 120. The primary plate assembly 120 is illustrated in FIG. 6. The primary plate assembly 120 can include both the first primary plate 121 and the second primary plate 221. A secondary plate assembly 140 can include both the first secondary plate 141 and the second secondary plate 241. The second primary plate 221 and the second secondary plate 241 can provide a mechanism so as to control or limit the passage of lawn clippings and other debris through the second discharge opening 102.

Figure 11:
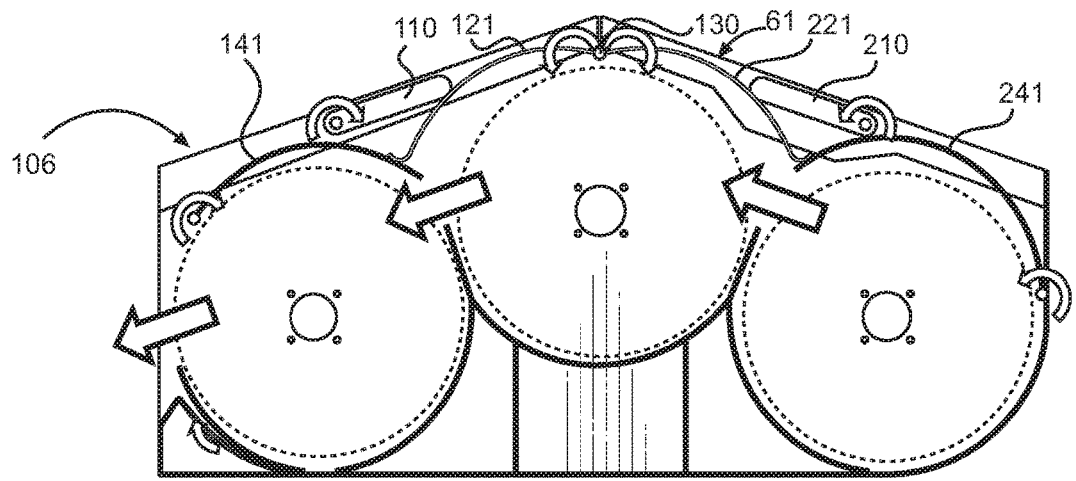
FIG. 11 is a schematic top view of the cutter housing assembly of FIG. 5, with conversion assembly in a discharge mode.
Figure 13:
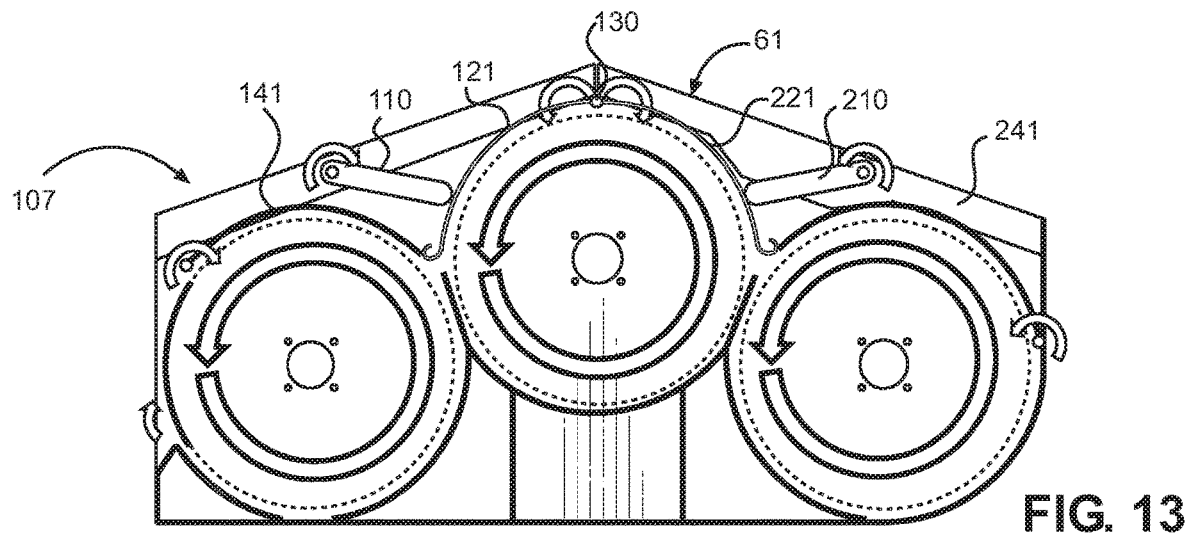
FIG. 13 is a schematic top view of the cutter housing assembly of FIG. 5, with conversion assembly in a mulch mode.

The cutter housing assembly 60 can include a third discharge opening 103. The third discharge opening 103 provides discharge from the third cutting chamber 73 to the exterior of the cutter housing 61. The conversion assembly 105 can also include an exterior plate assembly 170. The exterior plate assembly 170 can be moved, utilizing a plate actuator 176, from a discharge position to a mulch position. The exterior plate assembly 170 can include a plate body 171. The plate body 171 can include an upper edge 172. In the discharge position, as shown in FIG. 11, the plate body 171 can be moved so as to open up the third discharge opening 103. In such discharge position or mode, the plate body 171 can be retracted into the third cutting chamber 73. In the mulch position, as shown in FIG. 13, the plate body 171 can be moved so as to close or be positioned over the third discharge opening 103. Accordingly, a mulching mode is provided. The plate body 171 can be curved or concave so as to match with, or complete, the third chamber wall surface 93. As a result, effective air flow can be attained in the third cutting chamber 73 so as to provide an effective mulching mode.

The exterior plate assembly 170, including the plate body 171, can be slidably attached to the top wall 63 of the cutter housing 61. In particular, the exterior plate assembly 170 can be slidably supported within a slot arrangement 180. The slot arrangement 180 can include a plurality of slots 181. A plurality of support flanges 173 can be provided at or on the upper edge 172 of the plate body 171. A plurality of support flanges 172 can be slidably disposed in the slots 181. Different numbers of support flanges 173 can be used and this disclosure is not limited to the two support flanges shown in FIG. 10. The support flanges 173 can be of same or similar structure to each other. The support flanges 173 can each extend up through the slots 181 of the slot arrangement 180. The support flanges 173 can each include a support plate 174 that is positioned at right angles to the plate body 171 and that is positioned parallel to the top wall 63 of the cutter housing 61. The support flange 173 can also include a connection flange 175. The connection flange 175 can extend from the upper edge 172 of the plate body 171, through the thickness of the top wall 63, of the cutter housing 61, and attach to the support plate 174. Accordingly, the support plate 174 can be attached to the plate body 171, via the connection flange 175, and precluded, due to its structure, from sliding through the particular slot 181 in which it is disposed.

Figure 10:
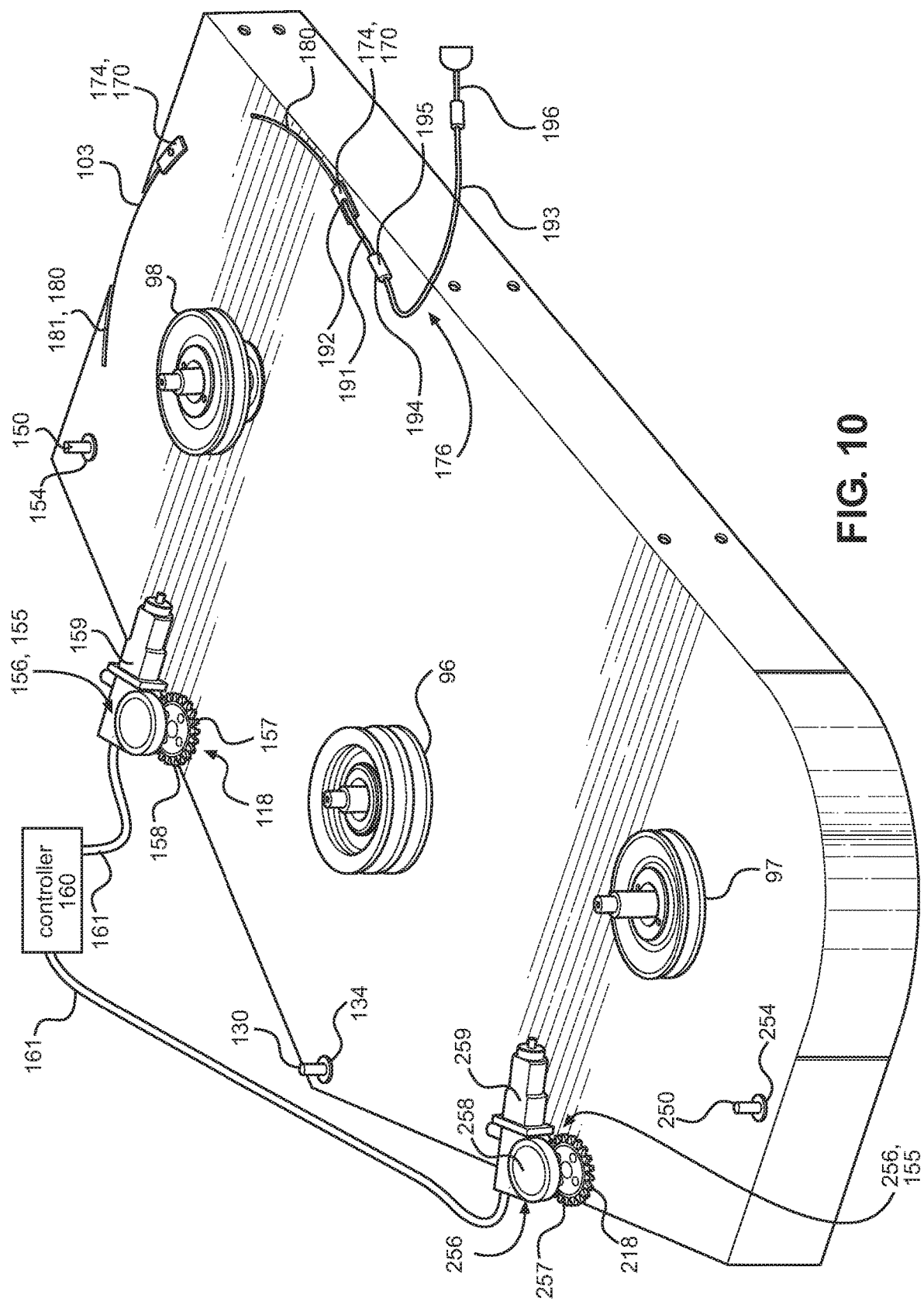
FIG. 10 is a schematic perspective top view of the cutter housing assembly of FIG. 5.

Accordingly, the support plate 174 in conjunction with the connection flange 175 can prevent the particular support flange 173 from being disengaged from the slot arrangement 180 while allowing rotation of the exterior plate assembly 170. Rotation can be limited by the length and position of the slots 180 since each support flange 173 is limited in travel by the length of the particular slot in which such support flange 173 is disposed. The support flange 173 can be constructed in different ways. Each support flange 173 can include a tab or flange that extends vertically upward from the upper edge 172 (to define a connection flange 175) and which is then bent over (to define the support plate 174). With such construct, the support plate 174, constituted by a bend at a top of the connection flange 175, may only extend in one direction from the connection flange 175. Such arrangement can be constructed of stamped metal. Alternatively, each support plate 174 can be a separate piece of metal or other material that is welded, spot welded, or otherwise attached to a respective connection flange 175. Such an arrangement or construct is shown in FIG. 17 and FIG. 10. With such construct, the support plate 174 can be attached at a central portion thereof to the particular connection flange 175. The support plate 174 can bridge over the slot 181 so as to engage with both sides of the particular slot 181, as shown in FIG. 10.

As described above, the exterior plate assembly 170 can be manipulated using a plate actuator 176. The plate actuator 176 can include a mechanical assembly that is connected to one or both of the support plates 174. For example, the plate actuator 176 can be a cable with housing that effects movement of the exterior plate assembly 170 from a mulch position to a discharge position. The plate actuator 176 can be other types of push/pull cable systems, crank and gear systems, motor and gear systems, or some other mechanical arrangement so as to impart movement of the exterior plate assembly 170 from a mulch position to a discharge position.

As shown in FIG. 10, the plate actuator 176 can include a cable 191 that is attached to one of the support plates 174 at an attachment end 192. The cable 191 can be housed in a cable housing 193 with a housing stop 194. The housing stop 194 can be welded (weld 195) or otherwise attached to the cutter housing 61. The plate actuator 176 can include a cable control end 197. The cable control end 196 can be directly manipulated by a user or can be manipulated by a further mechanical arrangement. A spring can bias the exterior plate assembly to the mulch mode or position, i.e. so that the cable 191 experiences and is used for tension, rather than a compressive force.

Hereinafter, further details of the particular structure of components of the cutter housing assembly 60 will be described in further detail with particular reference to the second rotation arm 210, the second primary plate 221, and the second secondary plate 241, as well as the second discharge opening 102.

The rotation arm 210 of the pair of rotation arms 109, can include an arm body 211. The arm body 211 can include a connection end 212 and a push end 216. The connection end 212 can be provided to pivotably attach to the cutter housing 61. The connection end 212 can include a pin aperture 213. The pin aperture 213 can receive a drive pin 215, i.e. a second drive pin. The drive pin 215 can be affixed to a pin barrel 214 at the connection end 212. The pin barrel 214 can be in the form of a knuckle or housing to support the drive pin 215. The drive pin 215 can be driven or controlled by a rotation actuator 256, i.e., a second rotation actuator. The second rotation actuator 256 and the first rotation actuator 156 may collectively constitute a rotation actuator assembly 155.

The drive pin 215 can extend above the top wall 63 of the cutter housing 61. The drive pin 215 can be rotatably supported by a housing pin support 218. The drive pin 215 can be solely supported by the housing pin support 218 in that a lower end of the drive pin 215 can be unsupported. Alternatively, a bearing or aperture can be provided in the front lower flange 95 so as to support a lower end of the drive pin 215. The rotation actuator 256 can also be positioned or attached to the top wall 63 of the cutter housing 61. The rotation actuator 256 can include a gear assembly 258 and/or motor or motor assembly 259 that is affixed to an upper end of the drive pin 215 so as to impart rotation to the drive pin 215. For example, a pinion gear 257 can be attached or welded to the top of the drive pin 215 and driven by a motor or other power mechanism 259.

The rotation arm 210 can also include the push end 216. The connection end 212 and the push end 216 can constitute opposing ends of the arm body 211. The push end 216 of the second rotation arm 210 can engage with the primary plate 221 so as to rotate the primary plate 221. The push end 216 of the rotation arm 210 can engage with the primary plate 221 to provide slide-press actuation. The slide-press actuation can include the rotation arm 210 sliding along an outer surface 226 of the primary plate 221 as the rotation arm 210, at the push end 216 thereof, presses the primary plate 221 to change between the discharge mode 106 and the mulch mode 107. Relatedly, the primary plate 221 can be biased toward the discharge mode 106 by a suitable spring, such as a coil spring or other. Accordingly, as shown in FIG. 5, the rotation arm 210 can be rotated counterclockwise so as to engage and apply pressure to the primary plate 221. As the rotation arm 210 rotates the primary plate 221, the rotation arm 210 can slide along the primary plate 221 so as to render the arrangements shown in FIG. 12 and FIG. 13. That is, counterclockwise rotation of the rotation arm 210 can impart rotation to the primary plate 221 to a point at which the rotation arm 210 is perpendicular or substantially perpendicular to the primary plate 241. A suitable controller 160 with sensors can be utilized so as to constrain or limit rotation of the rotation arm 210. Limiting the rotation could be done by a hard stop of some kind too. Rotation of the rotation arm 210 can be controlled so as to provide desired positioning of the second primary plate 221 along or relative to the second chamber walls or wall 82. Such desired positioning of the primary plate 221 can provide a continuous or substantially continuous circular inner mulch surface that includes an inner chamber surface 225, of the primary plate 221, and second chamber wall surface 92.

The primary plate 221 can include a primary plate body 222. The primary plate body 222 can include an upper edge 223 and a lower edge 224. The upper edge 223 can be provided with sufficient clearance, with respect to the underside 68 of the cutter housing 61, so as to freely rotate in operation. The lower edge 224 can be provided to be at the same height or substantially the same height as a lower edge of the chamber walls 80. The primary plate body 222 can include the inner chamber surface 225 as described above. The primary plate body can include an outer surface 226. The rotation arm 210 can engage with such outer surface 226, as described above. The outer surface 226 can be constructed of suitable material, surface preparation, paint, grease, or other mechanism so as to provide engagement that is conducive to the rotation arm 210 sliding across the primary plate 221 in conjunction with the rotation arm 210 imparting rotation to the primary plate 221.

The primary plate body 222 can include a connection end 227 and a push end 232. The connection end 227 can include structure to pivotably attach to the cutter housing 61. The connection end 227 can include a pin barrel or housing 228, which includes a pin aperture 229. The primary plate pin 130 can extend through and be positioned in the pin aperture 229. Accordingly, the pin barrel 228 can be engaged with and/or rotatably mate with the pin barrel 128 of the first primary plate 121. Accordingly, the primary plate pin 130 can rotatably support the first primary plate 121 and the second primary plate 221. The cutter housing 61, in the top wall 63, can include the pin receiving aperture or hole 134, as described above, so as to pivotably support the primary plate pin 130.

The primary plate pin 130 can be non-rotatably affixed to the cutter housing 61 in conjunction with the primary plate pin 130 being rotatably disposed in the pin barrel 228. The primary plate pin 130 can be non-rotatably affixed to the pin barrel 228 in conjunction with the primary plate pin 130 being rotatably disposed in holes, apertures or bearings in the cutter housing 61. In lieu of the primary plate pin 130, the connection end 227 (of the second primary plate 221) can be provided with protuberances or integrally formed pin structure so as to engage with a receiving aperture in the cutter housing 61.

The primary plate 221 can include the push end 232 as described above. The push end 232 can be rounded and smooth so as to provide effective slide-press actuation against the secondary plate 241. That is, the push end 232, in rotation thereof, can press against and slide across an outer surface 246 of the secondary plate 241. The push end 232 can include a curl flange 233. The curl flange 233 can provide the rounded and smooth structure so as to provide effective slide-press actuation of the primary plate 221 against the outer surface 246 of the secondary plate 241.

The primary plate 221 can include or be provided with a primary plate spring 231. The primary plate 221 can be biased toward the discharge mode 106 by the primary plate spring 231, which can include or be a coil spring, linear spring, extension spring, tension spring, or torsion spring, for example. A first end of primary plate spring 231 can be attached to or abutted against the cutter housing 61 with the other end of the primary plate spring 231 attached to or abutted against the primary plate 221, which can impart the counterclockwise rotational bias to the primary plate 221. Accordingly, the primary plate 221 can be biased into contact with the rotation arm 210 both (1) as the rotation arm 210 is pushing to slide-press actuate the primary plate 221 to the mulch mode 107, and (2) as the rotation arm 210 is retracting so as to slide-press actuate the primary plate 221 from the mulch mode 107 to the discharge mode 106. That is, as the end or push end 216 of the rotation arm 210 is being retracted (due to the clockwise rotation of the rotation arm 210, as shown in FIG. 5) a press and slide relationship is maintained due to the counterclockwise bias of the primary plate 221.

As described above, the secondary plate 241 can be rotated as a result of engagement with the primary plate 221. That is, the primary plate 221 can be engageable with the secondary plate 241 so as to pivot the secondary plate 241 between the mulch mode and the discharge mode.

The secondary plate 241 can include a secondary plate body 242. The secondary plate body 242 can include in upper edge 243 and a lower edge 244. The upper edge 243 can be provided with sufficient clearance, with respect to the underside 68 of the cutter housing 61, so as to freely rotate in operation. The lower edge 244 can be provided to be at the same height or substantially the same height as a lower edge of the chamber walls 80. The secondary plate body 242 can include an inner chamber surface 245. The secondary plate body 242 can include an outer surface 246. The primary plate 221, and specifically the push end 232 of the primary plate 221, can engage with such outer surface 246 so as to rotate the secondary plate 241. The outer surface 246 can be constructed of suitable material, or have a particular surface preparation such as paint, grease, or other mechanism so as to provide engagement that is conducive to the primary plate 221 sliding across the secondary plate 241 in conjunction with the primary plate 221 and impart rotation to the secondary plate 241. The secondary plate body 242 can include a connection end 247 and a wall engagement end 252. The connection end 247 can include structure to pivotally attach to the cutter housing 61. The connection end 247 can include a pin barrel or housing 248. The pin barrel can include a pin aperture 249. A secondary plate pin 250 can extend through and be positioned in the pin aperture 249. Accordingly, the secondary plate pin 250 can rotatably support the secondary plate 241. The cutter housing 61, in the top wall 63, can include a pin receiving aperture or hole 254 so as to pivotably support the secondary plate pin 250. The pin receiving aperture 254 can include suitable bearings structure and/or other structure so as to stably support the secondary plate 241. The secondary plate pin 250 can be non-rotatably affixed to the cutter housing 61 in conjunction with the secondary plate pin 250 being rotatably disposed in the pin barrel 248. The secondary plate pin 250 can be non-rotatably affixed to the pin barrel 258 in conjunction with the secondary plate pin 250 being rotatably disposed in an aperture, holes, or bearings in the cutter housing 61. In lieu of the secondary plate pin 250, the connection end 247 (of the secondary plate 241) can be provided with an integrally formed pin, for example, so as to engage with a receiving aperture or bearing in the cutter housing 61.

The secondary plate 241 can include a wall engagement end 252 as described above. The wall engagement end 252 can be constructed and of spatial relationship so as to engage, when in the mulch mode 107, with an end 89 of the second chamber wall 82, as illustrated in FIG. 5. The wall engagement end 252 can be a blunt end. The wall engagement end 252 can be curved or notched in some manner so as to match or meet with the end 89 of the second chamber wall 82, which can include the second shared wall 87.

The secondary plate 241 can include a secondary plate spring 251 and be biased towards the discharge mode 106 by the secondary plate spring 251. The secondary plate spring 251 can include or be a coil spring, linear spring, extension spring, tension spring or torsion spring, for example. A first end of the secondary plate spring 251 can be attached to or abutted against the cutter housing 61 with the other end of the secondary plate spring 251 attached to or abutted against the secondary plate 241, which can impart the clockwise rotational bias of the secondary plate 241. Accordingly, the secondary plate 241 can be biased into contact with the primary plate 221 both (1) as the primary plate 221 is pushing to slide-press actuate the secondary plate 241 to the mulch mode 107, and (2) as the primary plate 221 is retracting so as to slide-press actuate the secondary plate 241 from the mulch mode 107 to the discharge mode 106. That is, as the push end 232 of the primary plate 221 is being retracted (due to the counterclockwise rotation of the primary plate 221, as shown in FIG. 5) a press and slide relationship is maintained (between the primary plate 221 and the secondary plate 241) due to the clockwise bias of the secondary plate 241.

Each of the primary plates 121, 221 and the secondary plates 141, 241 can be curved about a respective vertical axis and can be circular or substantially circular in shape. Such curvature of the primary plates 121, 221 and the secondary plates 141, 241 can correspond and/or be complementary to the curvature of the corresponding cutting chamber 71, 72, 73.

It is appreciated that the various components of embodiments of the disclosure can be made from any of a variety of materials including, for example, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques might be utilized. Also, metal stamping or cutting can be utilized. For example, metal stamping or cutting can be utilized in construction of the cutter housing 61, the primary plates 121, and the secondary plates 141, as well as various other components described herein.

In accordance with the disclosed subject matter, features or characteristic of one embodiment may be used in conjunction with other embodiments of the disclosure, as may be desired.

While the subject matter has been described in detail with reference to exemplary embodiments thereof, it will be apparent to one skilled in the art that various changes can be made, and equivalents employed, without departing from the scope of the disclosure.

For example, the conversion assembly 105 has been described in use with a cutter housing having three cutting chambers. However, a conversion assembly 105 of the disclosure can be provided with a cutter housing having other number of cutting chambers, such as a single cutting chamber, two cutting chambers, or four cutting chambers, for example. In an arrangement having only one cutting chamber, the primary plate 121, with rotation arm 110, could be utilized without a secondary plate 141. In an arrangement having two cutting chambers, the first primary plate 121 and the first secondary plate 141 can be used, but without the second primary plate 121 and the second secondary plate 141

Additionally, the conversion assembly 105 of the disclosure can be used with a wide variety of types of lawnmower including a walk behind mower, self-propelled mower, tractor type, other ride-on type, or other type of lawnmower.

For example, embodiments are disclosed above in which components of the cutter housing assembly 60, such as the primary plates 121, 221 and/or secondary plates 141, 241 are constructed of a single or unitary piece. However, embodiments are intended to include or otherwise cover components that include or are constructed of multiple pieces. For example, multiple pieces of the primary plates 121, 221 and/or secondary plates 141, 241 can be separately stamped from metal and then connected together such as but not limited to welding, spot welding, adhesive or mechanical fasteners, for example. For example, embodiments are disclosed above in which the cutter housing 61; the cutting chambers 71, 72, 73; the primary plates 121, 221 and the secondary plates 141, 241 include a specific shape, geometry, or construction. It is appreciated that shape, dimension, and structure of components described herein may vary between different types of lawnmowers and different types of cutter housings. Accordingly, exemplary embodiments are intended to include or otherwise cover assemblies that include variations in shape, geometry, or construction as dependent on assemblies and lawnmowers with which the cutter housing assembly of the disclosure is intended to be utilized.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A cutter housing assembly for a lawnmower comprising:
    a cutter housing that has a front wall and includes a first cutting chamber with a first discharge opening;
    a first rotation arm pivotably attached to the cutter housing;
    a second rotation arm pivotably attached to the cutter housing;
    a first plate pivotably attached to the cutter housing;
    a second plate pivotably attached to the cutter housing, the first plate and second plate selectively rotatable between:
        (a) a discharge mode in which the first plate and second plate are positioned a first distance from the front wall of the cutter housing to provide a first gap, and
        (b) a mulch mode in which the first plate and second plate are positioned a second distance greater than the first distance from the front wall of the cutter housing to provide a decreased gap, relative to the first gap;
    a first actuator connected to the first rotation arm to cause rotation of the first rotation arm when actuated; and
    a second actuator connected to the second rotation arm to cause rotation of the second rotation arm when actuated, wherein
    actuation of the first actuator and second actuator causes the first plate and second plate to move between the discharge mode and the mulch mode, and
    the first plate and second plate pivot about a common axis and rotate in opposite directions with respect to each other as the first plate and second plate move between the discharge mode and the mulch mode.

2. The cutter housing assembly of claim 1, further including a third plate pivotably attached to the cutter housing and selectively rotatable between (a) the discharge mode in which the third plate is located an initial distance from the front wall, and (b) the mulch mode in which the third plate is located a final distance from the front wall that is greater than the initial distance.

3. The cutter housing assembly of claim 2, wherein the first plate is configured to engage with the third plate to pivot the third plate between the mulch mode and the discharge mode.

4. The cutter housing assembly of claim 3, further comprising a spring attached to the third plate and configured to bias the third plate towards one of the discharge mode and mulch mode.

5. The cutter housing assembly of claim 4, wherein the spring attached to the third plate biases both the third plate and first plate towards one of the discharge mode and mulch mode.

6. The cutter housing assembly of claim 1, wherein the first rotation arm is pivotably attached to the cutter housing at a connection end of the first rotation arm, and the first rotation arm further includes a push end, and the push end of the first rotation arm is configured to engage with the first plate.

7. The cutter housing assembly of claim 1, further including a first plate spring connected to the first plate such that the first plate is biased from the mulch mode to the discharge mode.

8. The cutter housing assembly of claim 1, further including:
    a first plate pin; and
    the cutter housing including a pin aperture that receives the first plate pin, wherein
    each of the first plate and the second plate are pivotally attached to the cutter housing by the first plate pin.

9. The cutter housing assembly of claim 1, wherein the first actuator includes a rotary electric motor.

10. The cutter housing assembly of claim 1, wherein the first plate is curved about a vertical axis to provide a curved surface; and
    the second plate is curved about a further vertical axis to provide a second curved surface.

11. The cutter housing assembly of claim 1, wherein the first plate and second plate are each connected to the cutter housing at a pin such that the first plate and second plate are each rotatable about the pin and extend away from the pin and each other, a curvature of each of the first plate and second plate is configured such that the first plate and second plate form concave surfaces facing away from the front wall of the cutter housing to define the first cutting chamber.

12. The cutter housing assembly of claim 1, further including a third plate and a fourth plate each pivotably attached to the cutter housing and selectively rotatable between (a) the discharge mode in which the third plate and fourth plate are located an initial distance from the front wall, and (b) the mulch mode in which the third plate and fourth plate are located a final distance from the front wall that is greater than the initial distance.

13. The cutter housing assembly of claim 12, wherein the first plate is configured to engage with the third plate to pivot the third plate between the mulch mode and the discharge mode, the second plate is configured to engage with the fourth plate to pivot the fourth plate between the mulch mode and the discharge mode, the first rotation arm moves along the first plate to cause the first plate and the third plate to move between the discharge mode and the mulch mode, and the second rotation arm moves along the second plate to cause the second plate and the fourth plate to move between the discharge mode and the mulch mode.

14. The cutter housing assembly of claim 1, wherein the cutter housing further includes a second cutting chamber with a second discharge opening, and a third cutting chamber with a third discharge opening, which is open to exterior of the cutter housing;
the first cutting chamber is disposed between the second cutting chamber and the third cutting chamber such that the first discharge opening is located between the first cutting chamber and the third cutting chamber and the second discharge opening is located between the first cutting chamber and the second cutting chamber;
the first plate forms a first portion of the first cutting chamber and obstructs at least a portion of the first opening when the first plate is in the mulch mode; and
the second plate forms a second portion of the first cutting chamber and obstructs at least a portion of the second opening when the second plate is in the mulch mode.

15. A cutter housing assembly for a lawnmower comprising:
a cutter housing that includes a first cutting chamber with a first discharge opening, and a further cutting chamber with a further discharge opening;
a primary plate movably attached to the cutter housing and selectively movable between:
(a) a discharge mode in which the primary plate is in a first position to provide a first gap associated with the first discharge opening, and (b) a mulch mode in which the primary plate is in a second position spaced from the first position to provide a decreased gap, relative to the first gap, associated with the first discharge opening; and
a secondary plate movably attached to the cutter housing and selectively movable by the primary plate between:
(a) a discharge mode in which the secondary plate is in an initial position, and (b) a mulch mode in which the secondary plate is in a final position different from the initial position when the primary plate moves between the discharge made and the mulch mode;
a first actuator controllable by a user and connected to the primary plate such that a user can cause the primary plate to move from the discharge mode first position to the mulch mode second position;
a rotation arm connected to the first actuator and movable on the primary plate such that, when the first actuator moves the rotation arm, the rotation arm causes the primary plate to move between the discharge mode and the mulch mode; and,
a third plate rotatably attached to the cutter housing and selectively rotatable between:
(a) a discharge mode in which the third plate is in a first rotary position, and
(b) a mulch mode in which the third plate is in a second rotary position different than the first rotary position, wherein
the primary plate and the third plate pivot about a common axis and rotate in opposite directions with respect to each other as the primary plate and the third plate move between the discharge mode and the mulch mode.

16. The cutter housing assembly of claim 15, wherein the primary plate is slidably in contact with the secondary plate to cause the secondary plate to move between the mulch mode and the discharge mode when the primary plate moves between the mulch mode and the discharge mode.

17. The cutter housing assembly of claim 16, further including:
a plurality of blades located in the cutter housing and each rotatable about a respective blade axis; and
a biasing structure connected between the third plate and the cutter housing, wherein
the primary plate, secondary plate and third plate are each curved in a direction such that each of the primary plate, secondary plate and third plate form separate concave surfaces facing towards at least one blade axis in the cutter housing.

18. A lawnmower comprising:
a cutter housing that includes a first cutting chamber with a first blade rotatable about a first blade axis, the first cutting chamber including a first discharge opening, and a second cutting chamber with a second blade rotatable about a second blade axis, the second cutting chamber including a second discharge opening leading to the first cutting chamber;
a first curved plate pivotably attached to the cutter housing such that the first curved plate is rotatable towards and away from the first blade axis;
a second curved plate pivotably attached to the cutter housing such that the second curved plate is rotatable towards and away from the second blade axis, the first curved plate movable on the second curved plate, the first curved plate and second curved plate selectively rotatable between:
(a) a discharge mode in which the first curved plate and second curved plate are positioned a first distance from the first blade axis and second blade axis, respectively, and (b) a mulch mode in which the first plate and second plate are positioned a second distance less than the first distance from the at least one of the first blade axis and second blade axis;
a first rotation arm pivotally attached to the cutter housing and movable on the first curved plate to cause the first curved plate to move between the discharge mode and the mulch mode and to cause the first curved plate to move the second curved plate between the discharge mode and the mulch mode;
a first actuator connected to the first rotation arm and moving the first rotation arm on the first curved plate when actuated;
a third curved plate pivotably attached to the cutter housing such that the third curved plate is rotatable towards and away from the first blade axis, the third curved plate is selectively rotatable between the discharge mode and the mulch mode;
a second rotation arm pivotally attached to the cutter housing and movable along the third plate to cause the third plate to move between the discharge mode and the mulch mode; and
a second actuator connected to the second rotation arm and moving the second rotation arm on the third curved plate when actuated, wherein
each of the first curved plate and third curved plate define a concave surface facing towards the first blade axis and the second curved plate defines a concave surface facing towards the second blade axis, wherein
the first curved plate and the third curved plate are pivotally connected together and move in opposite directions relative to each other as the first and third curved plates move between the discharge mode and the mulch mode.

* * * * *